US011880982B2

(12) United States Patent
Ma et al.

(10) Patent No.: US 11,880,982 B2
(45) Date of Patent: Jan. 23, 2024

(54) METHOD AND SYSTEM FOR PERFORMING IMAGE SEGMENTATION

(71) Applicant: Alibaba Group Holding Limited, George Town (KY)

(72) Inventors: Jianqiang Ma, Beijing (CN); Zhe Tang, Beijing (CN)

(73) Assignee: Alibaba Group Holding Limited

( * ) Notice: Subject to any disclaimer, the term of this patent is extended or adjusted under 35 U.S.C. 154(b) by 288 days.

(21) Appl. No.: 17/190,099

(22) Filed: Mar. 2, 2021

(65) Prior Publication Data
US 2021/0279887 A1 Sep. 9, 2021

(30) Foreign Application Priority Data
Mar. 4, 2020 (CN) .......................... 202010149322.8

(51) Int. Cl.
*G06K 9/00* (2022.01)
*G06T 7/174* (2017.01)
*G06T 7/12* (2017.01)

(52) U.S. Cl.
CPC ................ *G06T 7/174* (2017.01); *G06T 7/12* (2017.01); *G06T 2207/20081* (2013.01); *G06T 2207/20084* (2013.01); *G06T 2207/20164* (2013.01); *G06T 2207/20221* (2013.01)

(58) Field of Classification Search
CPC . G06T 7/174; G06T 7/12; G06T 2207/20081; G06T 2207/20084; G06T 2207/20164; G06T 2207/20221
USPC ......................................................... 382/173
See application file for complete search history.

(56) References Cited

U.S. PATENT DOCUMENTS

| | | |
|---|---|---|
| 2010/0014755 A1 | 1/2010 | Wilson |
| 2011/0242126 A1 | 10/2011 | Hoppe |
| 2012/0154828 A1 | 6/2012 | Tanaka |
| 2012/0257086 A1 | 10/2012 | Nakasugi |
| 2015/0242697 A1 | 8/2015 | Guo |
| 2015/0287211 A1 | 10/2015 | Mundhenk |
| 2021/0319233 A1* | 10/2021 | Childress, Jr. ........... H04N 7/15 |

OTHER PUBLICATIONS

Zeng, Yi, et al. "Towards high-resolution salient object detection." Proceedings of the IEEE/CVF international conference on computer vision. 2019. (Year: 2019).*
Bamford, Pascal Christopher. "Segmentation of cell images with application to cervical cancer screening." (1999). (Year: 1999).*

(Continued)

*Primary Examiner* — Jonathan S Lee
(74) *Attorney, Agent, or Firm* — Van Pelt, Yi & James LLP

(57) ABSTRACT

Segmenting an image is disclosed including acquiring a first image and a second image, the first image and the second image being obtained based on a same imaging target, and a resolution of the first image being greater than a resolution of the second image, performing image segmentation processing based on a plurality of sub-images of the first image to obtain a first initial segmentation result, performing image segmentation processing based on the second image to obtain a second initial segmentation result, merging, based on the imaging target, the first initial segmentation result with the second initial segmentation result to obtain a target segmentation result, and outputting or storing the target segment result.

12 Claims, 14 Drawing Sheets

(56) References Cited

OTHER PUBLICATIONS

Ma, Haojie, et al. "Improved CNN classification method for groups of buildings damaged by earthquake, based on high resolution remote sensing images." Remote Sensing 12.2 (2020): 260. (Year: 2020).*

* cited by examiner

2300

2310 — DOWNSAMPLE FIRST INITIAL SEGMENTATION RESULT, UPSAMPLE SECOND INITIAL SEGMENTATION RESULT, OR BOTH, CAUSING RESOLUTION OF FIRST INITIAL SEGMENTATION RESULT AND RESOLUTION OF SECOND INITIAL SEGMENTATION RESULT TO BECOME SAME

2320 — DETERMINE PIXEL CORRESPONDENCES BASED ON FIRST INITIAL SEGMENTATION RESULT AND SECOND INITIAL SEGMENTATION RESULT HAVING SAME RESOLUTION

2410 — DETERMINE FIRST SEGMENTATION MARKING INFORMATION AND SECOND SEGMENTATION MARKING INFORMATION OF TARGET PIXEL POSITIONS IN INITIAL SEGMENTATION RESULTS

2420 — DETERMINE TARGET SEGMENTATION MARKING INFORMATION OF TARGET PIXEL POSITIONS USING FIRST SEGMENTATION MARKING INFORMATION AND SECOND SEGMENTATION MARKING INFORMATION

FIG. 2F

METHOD AND SYSTEM FOR PERFORMING IMAGE SEGMENTATION

CROSS REFERENCE TO OTHER APPLICATIONS

This application claims priority to People's Republic of China Patent Application No. 202010149322.8 entitled SEGMENTATION METHOD, MEANS, ELECTRONIC DEVICE AND COMPUTER STORAGE MEDIUM filed Mar. 4, 2020 which is incorporated herein by reference for all purposes.

FIELD OF THE INVENTION

Embodiments of the present invention relate to a method and a system for performing image segmentation.

BACKGROUND OF THE INVENTION

In the field of image processing, segmenting objects included in images is performed. For example, in medical image processing, segmenting a lesion region in a pathology image for further analysis of pathology information is to be performed.

As an aspect, the accuracy of the image segmentation result is often low because the image has a relatively high resolution. For example, in the medical image processing field, pathology images have very high resolutions on the order of tens of thousands of pixels by tens of thousands of pixels, with the result that neural networks, such as U-Net, used to process pathology images cannot be directly trained and used on the graphics processing unit (GPU) of an electronic device. Therefore, the image is typically split into small blocks using the neural network processing, and then the image is segmented using the small blocks obtained from neural network processing. As a result, the segmentation result is relatively inaccurate.

BRIEF DESCRIPTION OF THE DRAWINGS

Various embodiments of the invention are disclosed in the following detailed description and the accompanying drawings.

FIG. 2E is a flowchart of an embodiment of a process for determining pixel correspondences of the first initial segmentation result and the second initial segmentation result based on the imaging target.

FIG. 2F is a flowchart of an embodiment of a process for merging the first initial segmentation result with the second initial segmentation result using the pixel correspondences.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
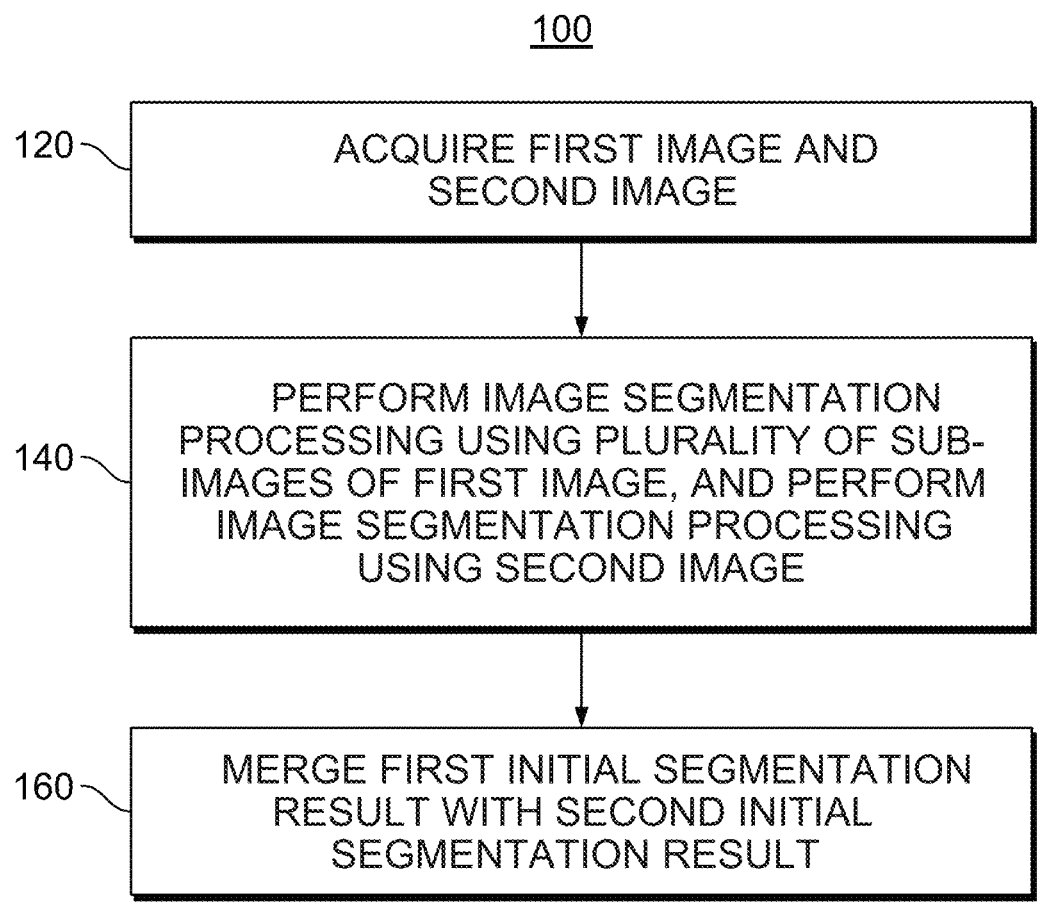
FIG. 1A is a flowchart of an embodiment of a process for segmenting an image.

FIG. 1A is a flowchart of an embodiment of a process for segmenting an image. In some embodiments, the process 100 is implemented by the device 700 of FIG. 7 and comprises:

In 120, the device acquires a first image and a second image. In some embodiments, the first image and the second image are acquired based on the same imaging target, and the resolution of the first image is greater than the resolution of the second image.

In some embodiments, the first image and the second image are pre-stored images. In some embodiments, the first image and the second image are images taken in real time by an image capturing device. The present application imposes no restrictions on the acquisition of the first image and the second image. As an example, the first and second images are images of a lesion region scanned by a high-resolution scanner and then stored in advance. In another example, the first image and the second image are images captured in real time by an image sensor of a self-driving car.

In addition, the resolution of the first image can be very high and not subject to hardware constraints of the electronic device that performs the process 100. For example, the first image can be tens of thousands of pixels-by-tens of thousands of pixels. The resolution of the second image, as an aspect, can be subject to hardware constraints of the electronic device that performs the process 100. Thus, the electronic device can be used to perform the image segmentation processing operation 140 based on the second image.

In process 100, the first and second images can be obtained using the same imaging target. In other words, the first and second images can include features of the same imaging target. Thus, initial segmentation of the first and second images can be performed based on features of the imaging target.

Features of the imaging target can be divided into local features and global features. In some embodiments, because the resolution of the first image is greater than the resolution of the second image, a higher proportion of local features among the imaging target features are typically included in the first image, while a higher proportion of global features among the imaging target features are typically included in the second image. For example, the first image and the second image are obtained by scanning the imaging target at a first scanning magnification and a second scanning magnification, respectively. For example, the first scanning magnification is greater than the second scanning magnification.

In 140, the device performs image segmentation processing using a plurality of sub-images of the first image to obtain a first initial segmentation result, and performs image segmentation processing using the second image to obtain a second initial segmentation result.

For example, the image segmentation processing includes segmentation processing using the background and the foreground in an image. In another example, the image segmentation processing includes semantic segmentation. In performing the semantic segmentation, the semantic segmentation identifies an imaging target in an image and determines the position of the imaging target by determining pixels corresponding to the imaging target. As an example, with semantic segmentation, each pixel in an image is marked. A marking can indicate whether the pixel belongs to the imaging target or indicate to which imaging target the pixel belongs. In some embodiments, the imaging target is part or all of a medical examination subject. For example, the imaging target corresponds to a liver or a tumor on the liver. In another example, the imaging target corresponds to a vehicle or a pedestrian in a driving environment.

In some embodiments, a segmentation processing technique based on the first image is performed in parallel with a segmentation processing technique based on the second image. In some embodiments, the segmentation processing techniques are performed according to a preset sequence.

The plurality of sub-images of the first image can be obtained by cutting the first image or demarcating windows on the first image. Resolutions of the plurality of sub-images can be the same or different.

By performing image segmentation processing separately on each of the plurality of sub-images, a first initial segmentation result corresponding to the first image can be obtained.

The proportion of local features typically is greater in the first image. Moreover, since the first initial segmentation result is obtained from the plurality of sub-images associated with the first image, and because some of the global features are lost in the process of determining the plurality of sub-images, the proportion of local features in the plurality of sub-images can be greater that the proportion of global features in the plurality of sub-images. Therefore, the first initial segmentation result can relate more to local features. In other words the first initial segmentation result can be more precise, but errors can occur in the segmentation result corresponding to a specific sub-image.

In the second image, the proportion of global features is greater that the proportion of local features and no loss of global features occur in the image segmentation processing performed based on the overall second image. Therefore, the second initial segmentation result can relate more to global features. In other words, the position of the segmented imaging target can be more accurate, and no local errors occur. However, the segmentation results for edge regions of the imaging target can be insufficiently precise.

In 160, the device merges the first initial segmentation result with the second initial segmentation result using the imaging target to obtain a target segmentation result.

The first and second images can be generated using the same imaging target. In some embodiments, the first initial segmentation result is merged with the second initial segmentation result using the imaging target.

In addition, from operation 140, the first initial segmentation result can be more precise. As an aspect, errors can occur in the segmentation result corresponding to a specific sub-image. As another aspect, the second initial segmentation result can be more focused on global features. In other words, the position of the segmented imaging target can be more accurate, and no local errors can occur. As another aspect, the segmentation results for edge regions of the imaging target are insufficiently precise.

The first initial segmentation result is merged with the second initial segmentation result from operation 160. The precision of the target segmentation result can be ensured by the first initial segmentation result, and errors in the segmentation result corresponding to a specific sub-image in the first initial segmentation result can be corrected by the second initial segmentation result, thus ensuring the accuracy and the precision of the target segmentation result.

Figure 1B:
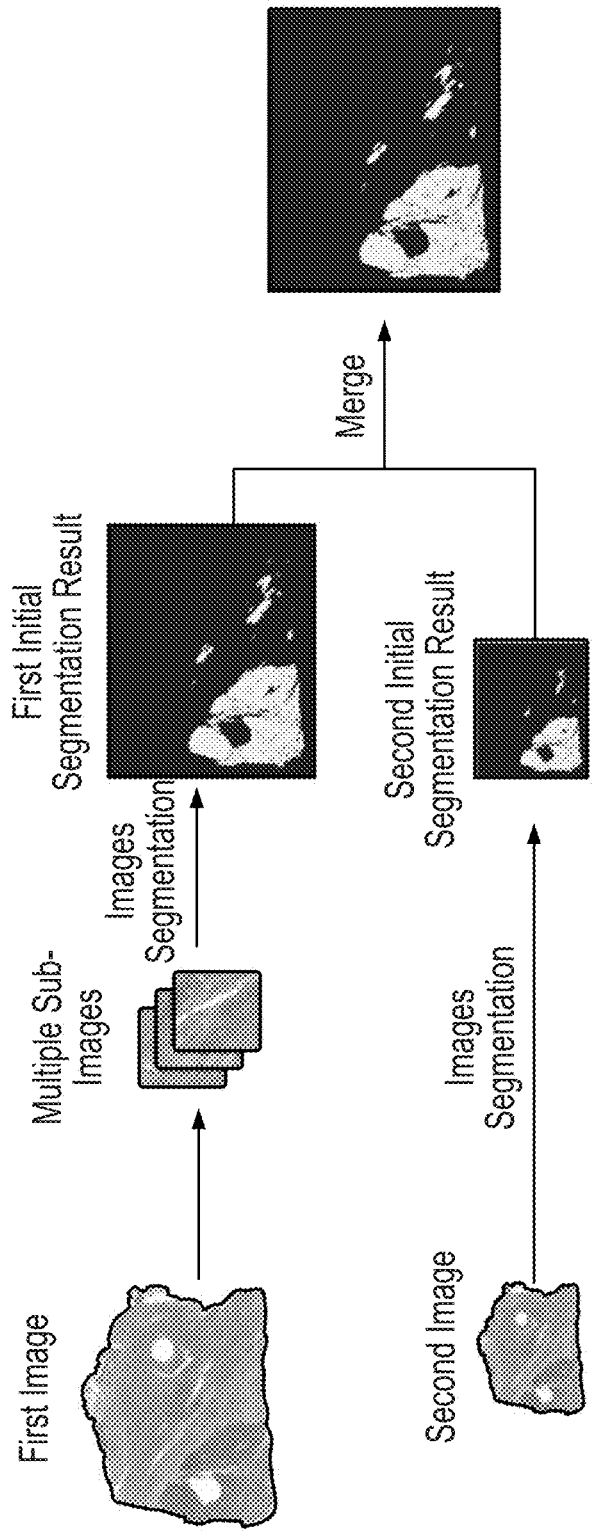
FIG. 1B is a diagram of an example of the process for segmenting an image illustrated in FIG. 1A.

FIG. 1B is a diagram of an example of the process for segmenting an image illustrated in FIG. 1A.

A first image and a second image can be acquired. For example, the first image and the second image are obtained based on the same imaging target, and the resolution of the first image is greater than the resolution of the second image.

Multiple sub-images are obtained from the first image, and the multiple sub-images are subjected to image segmentation processing to determine a first initial segmentation result. The first initial segmentation result corresponds to the image after all the pixels of the first image have been marked. In some embodiments, black indicates the pixel has been marked as background and white indicates the pixel has been marked as foreground. Image segmentation processing is performed on the second image to obtain a second initial segmentation result. The second initial segmentation result is similar to the first initial segmentation result and will not be discussed further for conciseness.

A target segmentation result can be obtained by merging the first initial segmentation result with the second initial segmentation result.

In some embodiments, a process for segmenting an image is provided as follows: a first image and a second image are acquired. In some embodiments, the first image and the second image are obtained based on the same imaging target, and the resolution of the first image is greater than the resolution of the second image. A first initial segmentation result is obtained by performing image segmentation processing using multiple sub-images obtained from the first image to cause the first initial segmentation result to be more focused on local features. In other words, the first initial segmentation result is more precise, but errors can occur in the segmentation result corresponding to a specific sub-image. A second initial segmentation result is obtained by performing image segmentation processing on the second image to cause the second initial segmentation result to be more focused on global features. In other words, the position of the segmented imaging target is more accurate, and no local errors occur. As an aspect, the segmentation results for edge regions of the imaging target can be insufficiently precise. It is possible to merge, using the imaging target, the first initial segmentation result with the second initial segmentation result to obtain a target segmentation result. The precision of the target segmentation result can be ensured using the first initial segmentation result, and errors in the segmentation result corresponding to a particular sub-image associated with the first initial segmentation result can be corrected using the second initial segmentation result. Thus the accuracy and the precision of the target segmentation result are increased.

The process 100 for segmenting an image can be performed by any appropriate electronic device capable of processing data, including but not limited to: servers, mobile terminals (e.g., cell phones and PADs), PCs, or any combination thereof.

Figure 2A:
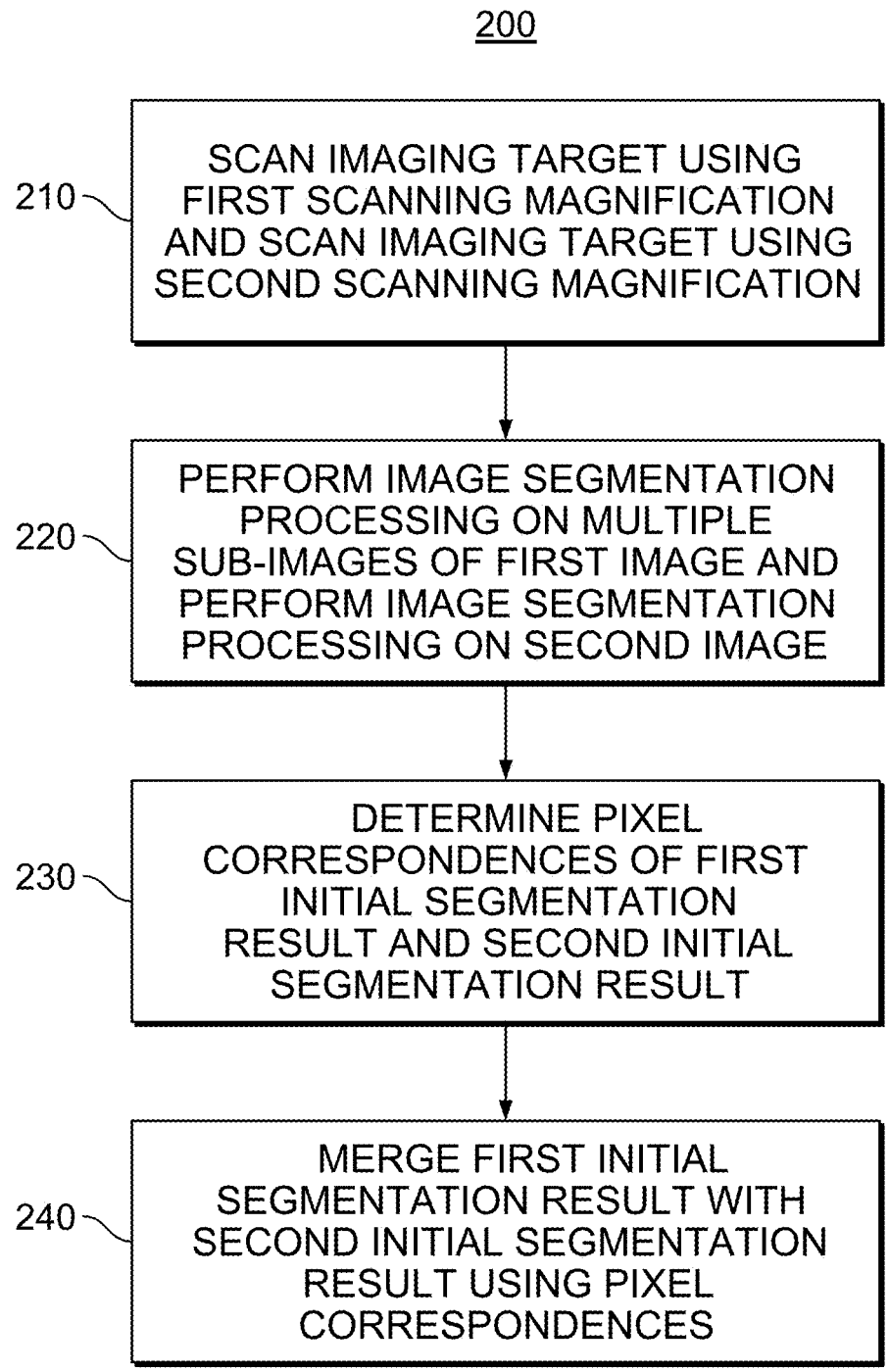
FIG. 2A is a flowchart of another embodiment of a process for segmenting an image.

FIG. 2A is a flowchart of another embodiment of a process for segmenting an image. In some embodiments, the process 200 is implemented by the device 700 of FIG. 7 and comprises:

In 210, the device, separately, scans an imaging target using a first scanning magnification to obtain a first image, and scans the imaging target using a second scanning magnification to obtain a second image.

In some embodiments, the first scanning magnification is greater than the second scanning magnification, and as a result, the resolution of the first image is greater than the resolution of the second image.

In some embodiments, the scanning of the imaging target and the obtaining of the first image after enlarging the imaging target using the first scanning magnification is possible and the scanning of the imaging target and the obtaining of the second image after enlarging the imaging target using the second scanning magnification is possible.

In some embodiments, the scanning of the imaging target and the obtaining of the first image after enlarging the imaging target using the first scanning magnification and then subjecting the first image to zoom processing to obtain a second image using the second scanning magnification is possible.

In some embodiments, multiple first images exist, and the resolutions of the multiple first images are different. Also, multiple second images can exist, and the resolutions of the multiple second images can differ.

In 220, the device performs image segmentation processing on multiple sub-images of the first image to obtain a first initial segmentation result, and performs image segmentation processing on the second image to obtain a second initial segmentation result.

In the event that multiple first images or multiple second images exist, the subjecting of the sub-images of the multiple first images to image segmentation processing can be executed in parallel, and the subjecting of the multiple second images to image segmentation processing can also be executed in parallel. In some embodiments, the subjecting of the images to image segmentation processing can also be executed according to a set sequence.

In some embodiments, to ensure the accuracy of segmentation results and avoid omissions, an overlap region between two of the sub-images having adjacent positions among the multiple sub-images of the first image exists. In some embodiments, an overlap region exists between any two sub-images that are adjacent to each other among the multiple sub-images. In some embodiments, an overlap region exists between only some pairs of sub-images that are adjacent to each other.

Figure 2B:
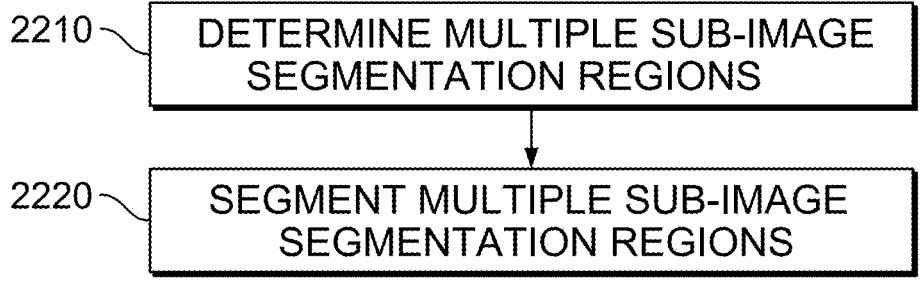
FIG. 2B is a flowchart of an embodiment of a process for performing image segmentation processing on multiple sub-images of the first image.

FIG. 2B is a flowchart of an embodiment of a process for performing image segmentation processing on multiple sub-images of the first image. In some embodiments, the process 2200 is an implementation of operation 220 of FIG. 2A and comprises:

In 2210, the device determines multiple sub-image segmentation regions in the first image.

In 2220, the device segments the multiple sub-image segmentation regions to obtain the multiple sub-images. In some embodiments, the multiple sub-image segmentation regions include a first sub-image segmentation region and a second sub-image segmentation region, which are adjacent to each other. In some embodiments, the first sub-image segmentation region and the second sub-image segmentation region overlap at least partially.

Figure 2C:
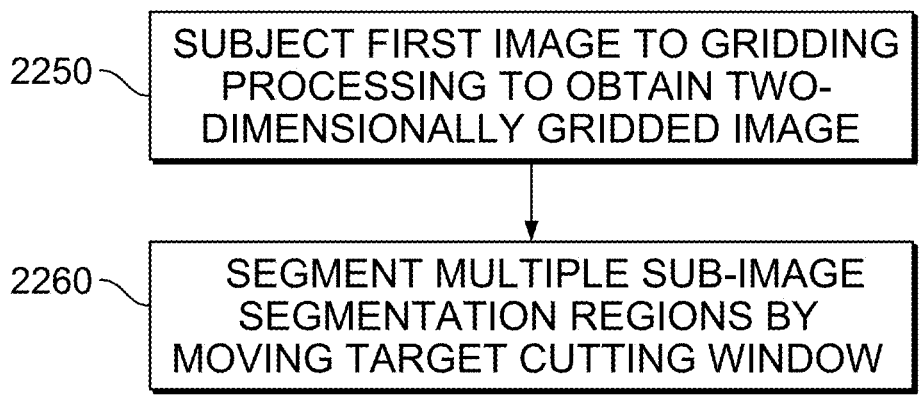
FIG. 2C is a flowchart of another embodiment of a process for performing image segmentation processing on multiple sub-images of the first image.

FIG. 2C is a flowchart of another embodiment of a process for performing image segmentation processing on multiple sub-images of the first image. In some embodiments, the process 2240 is an implementation of operation 220 of FIG. 2A and comprises:

In 2250, the device subjects the first image to gridding processing to obtain a two-dimensionally gridded image.

In 2260, in the two-dimensionally gridded image, the device segments the multiple sub-image segmentation regions by moving a target cutting window based on a target step length in a target dimension. In some embodiments, the number of cells of the target step length is no greater than the number of cells of the target cutting window in the target dimension. Using FIG. 3C as an example, a first image is divided into a plurality of cells. As an example, the target step length corresponds to 1-cell, target dimension corresponds to horizontal or vertical, and a target cutting window corresponds to 2*2-cell. In FIG. 3C, the 4 cells marked by 1 (target cutting window 1) overlaps with the 4 cells marked by 2 (target cutting window 2), and target cutting windows 1 and 2 have an overlap region of 2 cells. If the number of cells of the target step length is the same as the number of cells of the target cutting window in the target dimension, there will be no overlap in the cutting results, and if the number of cells of the target step length is smaller than the number of cells of the target cutting window in the target dimension, there will be overlap in the cutting results. As example, in FIG. 3C, the number of cells of the target step length is less than the number of cells of the target cutting window in the target dimension, and as a result, there was an overlap region. In another example, the number of cells of the target step length is equal to the number of cells of the target cutting window in the target dimension, there is no overlap.

In some embodiments, the image segmentation processing is performed by a pre-trained neural network model. As an example, the neural network model that performs image segmentation processing using multiple sub-images of a first image is to be called a first neural network model, and the neural network model that performs image segmentation processing based on a second image is to be called a second neural network model.

In some embodiments, to increase the accuracy of the target segmentation result, before performing the image segmentation processing, the first image or the second image undergoes data augmentation processing. The data augmentation processing can include the following: flipping, random cropping, color jittering, translation, scaling, contrast transformation, noising, rotation transformation/reflection transformation, etc.

In some embodiments, multiple sub-images of the first image undergo data augmentation processing, or the second image directly undergoes data augmentation processing.

Figure 2D:
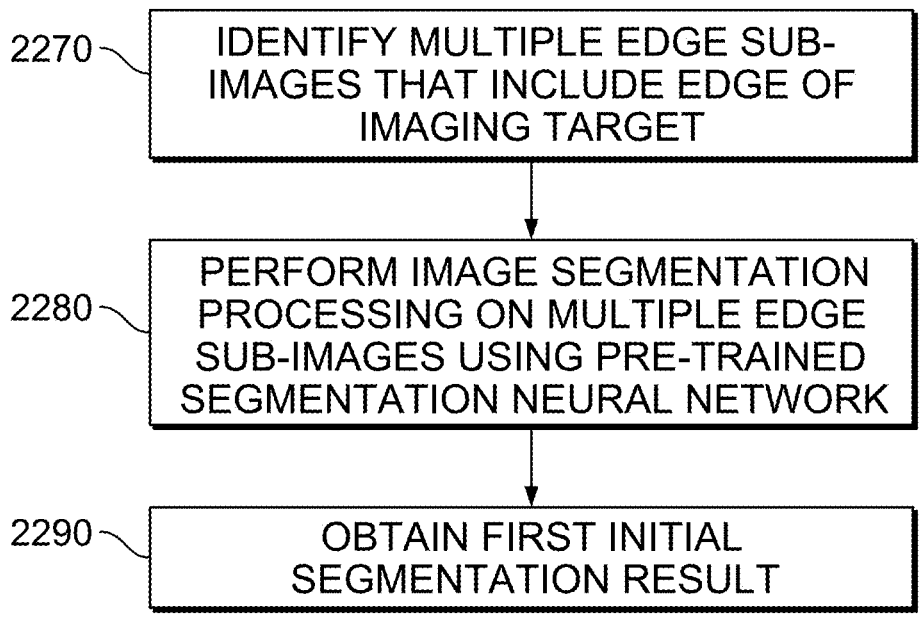
FIG. 2D is a flowchart of yet another embodiment of a process for performing image segmentation processing on multiple sub-images of the first image.

FIG. 2D is a flowchart of yet another embodiment of a process for performing image segmentation processing on multiple sub-images of the first image. In some embodiments, the process 2265 is an implementation of operation 220 of FIG. 2A and comprises:

In 2270, the device identifies multiple edge sub-images that include an edge of the imaging target from among the multiple sub-images.

In 2280, the device performs image segmentation processing on the multiple edge sub-images using a pre-trained segmentation neural network to obtain multiple sub-segmentation results individually corresponding to the edge sub-images.

In 2290, the device obtains the first initial segmentation result based on the multiple sub-segmentation results.

In some embodiments, the first neural network model includes, first, a neural network branch configured to determine whether a sub-image is an edge sub-image, and second, a pre-trained segmentation neural network. In the event that multiple sub-images are input into the first neural network model, the neural network branch is configured to determine whether an input sub-image is an edge sub-image. In the event that the input sub-image is an edge sub-image, the edge sub-image can undergo image segmentation processing using the pre-trained segmentation neural network to obtain a corresponding sub-segmentation result. Thus, obtaining multiple sub-segmentation results individually corresponding to the edge sub-images is possible after the multiple edge sub-images have undergone processing. Subsequently, obtaining a first initial segmentation result is possible.

Some of the benefits of the first preset segmentation result include that it is more focused on local features, i.e., the first initial segmentation result is more precise, and higher segmentation precision requirements for imaging target edges during image segmentation processing exist. Therefore, by identifying multiple edge sub-images of the imaging target edges, and then subjecting the multiple edge sub-images to image segmentation processing using a pre-trained segmentation neural network, multiple sub-segmentation results individually corresponding to edge sub-images are obtained. As a result, the first preset segmentation result is more focused on the edges of the imaging target. This makes image segmentation processing more efficient.

Referring back to FIG. 2A, in some embodiments, in 220, the performing of the image segmentation processing on multiple sub-images of the first image to obtain a first initial segmentation result, and the performing of the image segmentation processing on the second image to obtain a second initial segmentation result further include: identifying multiple non-edge sub-images that do not include an edge of the imaging target from among the multiple sub-images, and determining multiple sub-segmentation results corresponding to the multiple non-edge sub-images based on image content included in the multiple non-edge sub-images.

In some embodiments, the obtaining of the first initial segmentation result based on the multiple sub-segmentation results comprises: stitching together the multiple sub-segmentation results individually corresponding to the multiple edge sub-images with the multiple pieces of segmentation marking information individually corresponding to the multiple non-edge sub-images to obtain the first initial segmentation result. As an example, a sub-image is marked as 0 to correspond with a sub-image that does not include the imaging target, and a sub-image is marked as 1 to correspond with a sub-image that includes the imaging target (a non-edge sub-image).

In some embodiments, non-edge sub-images do not include edges of the imaging target. Thus, determining that the non-edge sub-images either only include the imaging target that is to be segmented or do not include the imaging target that is to be segmented is possible. Therefore, determining segmentation marking information corresponding to the non-edge sub-images directly is possible, without having to subject the non-edge sub-images to image segmentation processing using a pre-trained segmentation neural network. Thus, image segmentation processing can be made more efficient.

As an example, multiple sub-images of the first image are sequentially input into a first neural network model. In the event that a particular sub-image is determined by the first neural network model to be an edge sub-image, a pre-trained segmentation neural network within the first neural network model can be used to perform image segmentation processing on the edge sub-image to obtain a corresponding sub-segmentation result. In another example, a particular sub-image is determined by the first neural network model to be a non-edge sub-image, in which case the segmentation marking information for all pixels in this non-edge sub-image can be determined as either marking information corresponding to the imaging target to be segmented or as marking information corresponding to the background, depending on the image content of the non-edge sub-image. After all the sub-images are processed by the first neural network model, the multiple sub-segmentation results of the multiple edge sub-images are stitched together with the multiple sub-segmentation results of the multiple non-edge sub-images to obtain the first initial segmentation result.

In some embodiments, the identifying of the multiple edge sub-images that include an edge of the imaging target from among the multiple sub-images comprises: classifying the multiple sub-images using a pre-trained classifier to identify multiple edge sub-images, from the multiple sub-images, that include an edge of the imaging target. Thus, quickly identifying edge sub-images among the multiple sub-images is possible. In some embodiments, non-edge sub-images can be identified using a classifier.

Any image classification technique can be used to classify the images. Because image classification techniques are understood by one of ordinary skill, the image classification techniques will not be further discussed for conciseness.

In addition, typically, though the above segmentation neural network undergoes training with a complete sample image, the complete sample image is still cut into multiple sample sub-images during the training of the segmentation neural network, and then the training is conducted using the multiple sample sub-images. Thus, the training convergence speed can be slower.

In some embodiments, to increase the convergence speed during the segmentation neural network training, the segmentation neural network is pre-trained using the following: cutting a sample image into multiple sample sub-images, and identifying, from the multiple sample sub-images, multiple edge sample sub-images that include an edge of the imaging target; determining, based on the segmentation neural network, edge prediction sub-segmentation results corresponding to the multiple edge sample sub-images; and adjusting parameters in the segmentation neural network based on the edge prediction sub-segmentation results.

When the segmentation neural network is being used, the segmentation neural network is performing initial segmentation of edge sub-images. Adjusting the parameters in the segmentation neural network is performed based only on edge prediction sub-segmentation results corresponding to the edge sample sub-images without having to use the non-edge sample sub-images corresponding to the sample images based on training. As a result, the segmentation neural network convergence speed can be increased.

In some embodiments, the second neural network model or the segmentation neural network includes a fully convolutional neural network model (FCN, Fully Convolutional Networks for Semantic Segmentation), a convolutional neural network model for biomedical image segmentation (U-Net), a fully convolutional network model for pixel-level image segmentation (SegNet), or a deep learning model for image segmentation (DeepLab).

Referring back to FIG. 2A, in 230, the device determines pixel correspondences of the first initial segmentation result and the second initial segmentation result based on the imaging target.

In some embodiments, since the first initial segmentation result corresponds to the first image, and the second initial segmentation result corresponds to the second image, and the resolutions of the first image and the second image differ, differences between the first and second images with regard to the total number of pixels and the number of pixels constituting the width or the length exist. Pixels at the same position in the first and second images can correspond to different positions in the imaging target. Consequently, an erroneous result is to occur in the event that the first initial segmentation result is directly merged with the second initial segmentation result.

Therefore, in some embodiments, the pixel correspondences of the first initial segmentation result and the second initial segmentation result are first determined based on the imaging target through operation 230. Subsequently, ensuring the accuracy of the target segmentation result obtained through merging can be performed in a subsequent operation.

As an example, the pixel correspondences are used to indicate the pixels of the same position in the corresponding imaging target in the first image and the second image. The pixel correspondences can then be used to indicate the first and second initial segmentation results which can be merged.

FIG. 2E is a flowchart of an embodiment of a process for determining pixel correspondences of the first initial segmentation result and the second initial segmentation result based on the imaging target. In some embodiments, the process 2300 is an implementation of operation 230 of FIG. 2A and comprises:

In 2310, the device downsamples the first initial segmentation result, upsamples the second initial segmentation result, or both, causing the resolution of the first initial segmentation result and the resolution of the second initial segmentation result to become the same.

In 2320, the device determines the pixel correspondences based on the first initial segmentation result and the second initial segmentation result having the same resolution.

Downsampling the first initial segmentation result, upsampling the second initial segmentation result, or both causes the first initial segmentation result to have the same resolution as the processed second initial segmentation result. Therefore, as long as positions in the imaging target in the first initial segmentation result and the imaging target in the second initial segmentation result are aligned (for example, the centers of the imaging targets are aligned), the pixels in the first initial segmentation result and the pixels in the second initial segmentation result are merged in a one-to-one correspondence. As an aspect, in the event that the imaging target has the same position in the first image or the second image, the default pixel correspondence can be a one-to-one correspondence of pixels in the same position.

In some embodiments, to increase the accuracy of the target segmentation result obtained through merger, the second initial segmentation result undergoes upsampling to cause the first initial segmentation result and the processed second initial segmentation result to have the same resolution. Of course, to reduce the quantity of computations and reduce the resolution of the target segmentation result, the first initial segmentation result can undergo downsampling; or the first initial segmentation result can undergo downsampling, while the second initial segmentation result undergoes upsampling.

In addition, in the event that multiple first images or second images exist, multiple first initial segmentation results or second initial segmentation results can exist, in which case identification of the initial segmentation result that has the highest resolution among the multiple first initial segmentation results or second initial segmentation results and subjecting the other first initial segmentation results or second initial segmentation results to upsampling is possible.

Referring back to FIG. 2A, in 240, the device merges the first initial segmentation result with the second initial segmentation result using the pixel correspondences to obtain the target segmentation result.

FIG. 2F is a flowchart of an embodiment of a process for merging the first initial segmentation result with the second initial segmentation result using the pixel correspondences. In some embodiments, the process 2400 is an implementation of operation 240 of FIG. 2A and comprises:

In 2410, the device separately determines first segmentation marking information and second segmentation marking information of target pixel positions in the first initial segmentation result and the second initial segmentation result based on the pixel correspondences.

In 2420, the device determines target segmentation marking information of the target pixel positions using the first segmentation marking information and the second segmentation marking information to obtain the target segmentation result.

In some embodiments, the target pixel positions coordinate information for target pixels. For example, the coordinate origin is the lower-left corner of the first initial segmentation result image or the lower-left corner of the second initial segmentation result image.

Segmentation marking information can be used to indicate the marking type of the target pixel. For example, the marking type can be "imaging target" or "background." The edge of a segmented imaging target can lie between two adjacent pixels of different marking types.

In the event that the target segmentation marking information for the target pixel position is specifically determined based on the first segmentation marking information and the second segmentation marking information, the approach that is used can be voting based on the first segmentation marking information and the second segmentation marking information, or voting can be combined with weighting calculations based on the first segmentation marking information and the second segmentation marking information.

In the image segmentation technique provided, in addition to the first neural network which performs segmentation processing on multiple sub-images of the first image, a classifier exists that identifies multiple edge sub-images from among the multiple sub-images. As a result, the first initial segmentation result is more focused on the edges of the imaging target.

The process 100 for segmenting an image can be executed by any appropriate electronic device capable of processing data, including but not limited to: servers, mobile terminals (e.g., cell phones and PADs), PCs, or any combination thereof.

Figure 3A:
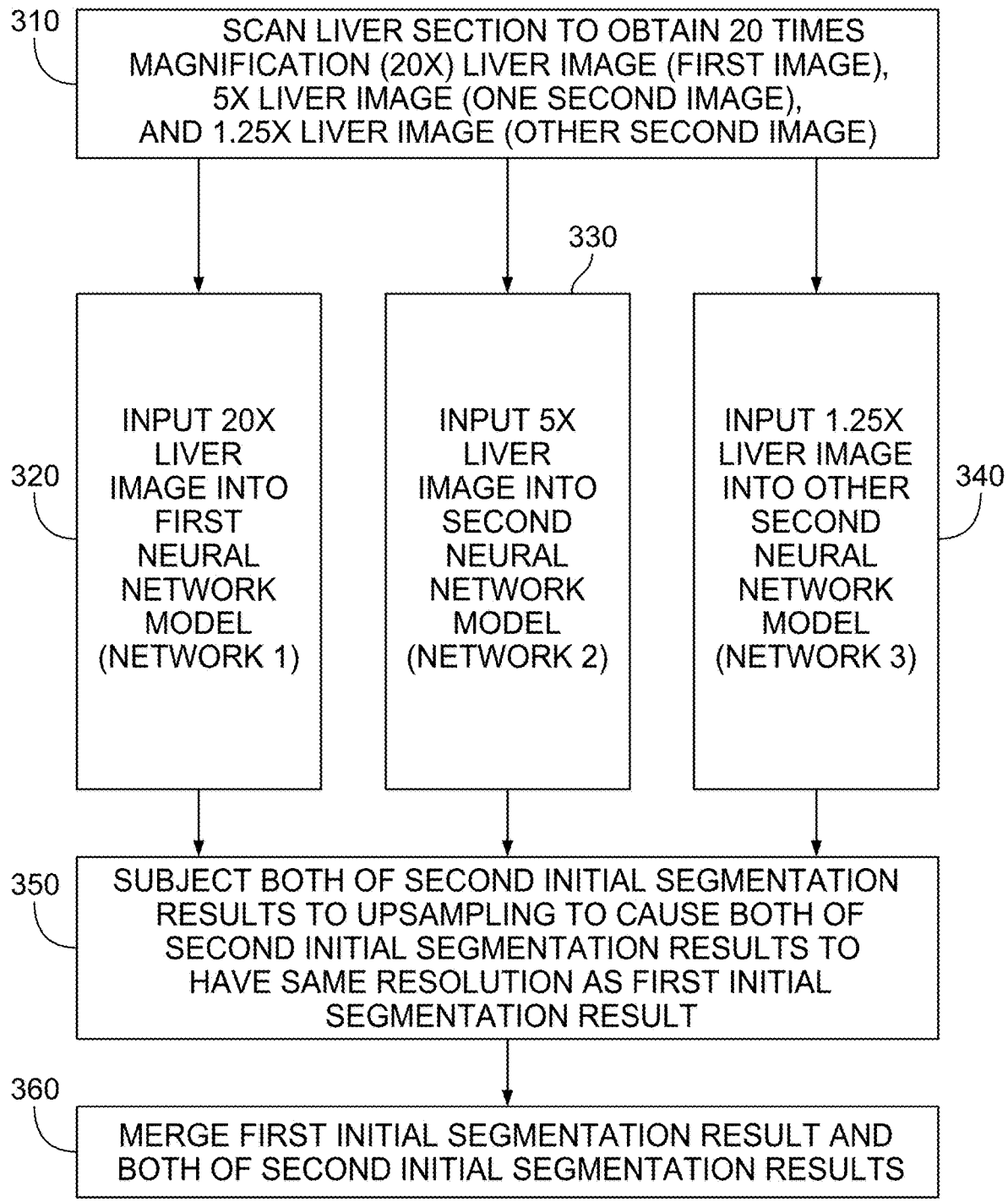
FIG. 3A is a flowchart of yet another embodiment of a process for segmenting an image.

FIG. 3A is a flowchart of yet another embodiment of a process for segmenting an image. In some embodiments, the process 300 is implemented by the device 700 of FIG. 7 and comprises:

As an example, one first image and two second images are provided for the purposes of illustration.

In 310, the device scans a liver section to obtain a 20 times magnification (20×) liver image (first image), a 5× liver image (one second image), and a 1.25× liver image (another second image).

Figure 3B:
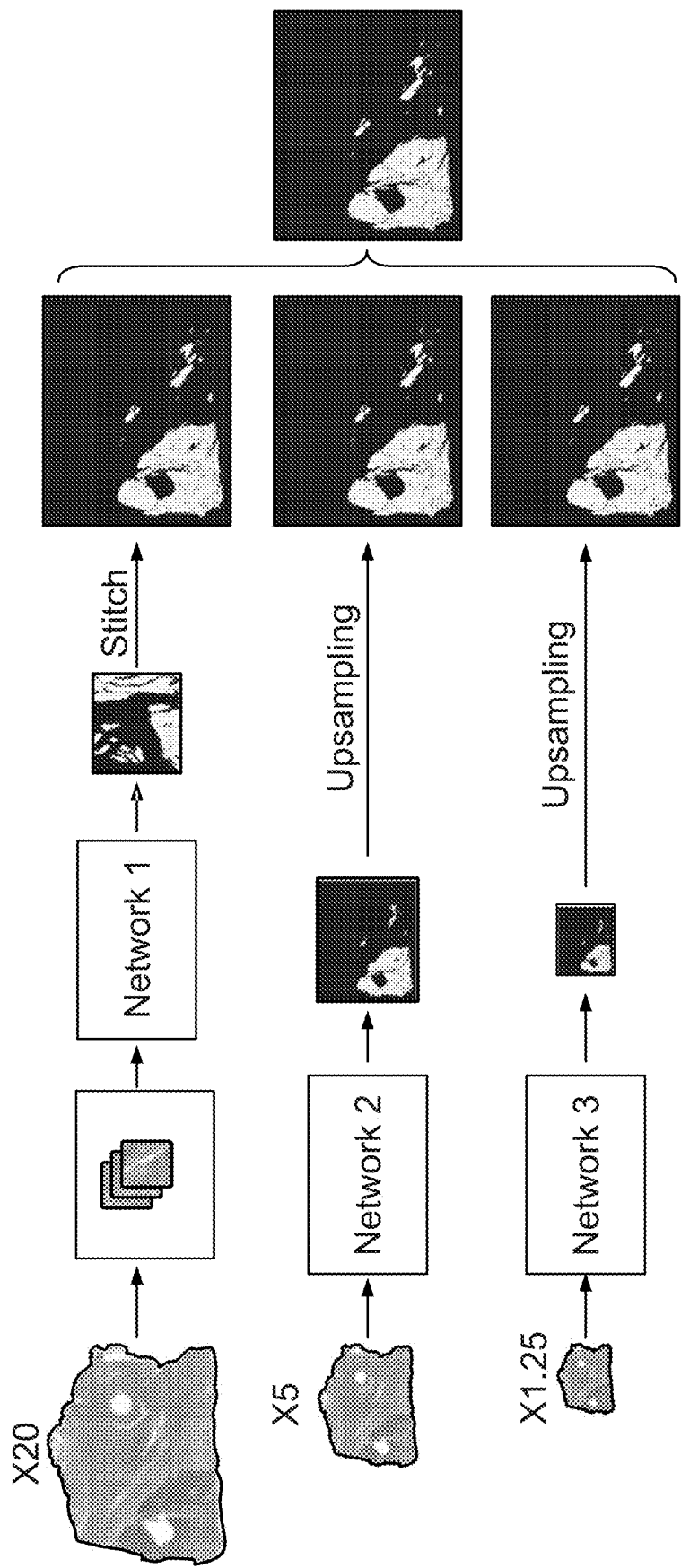
FIG. 3B is a diagram of an example of the process for segmenting an image depicted in FIG. 3A.
Figure 3C:
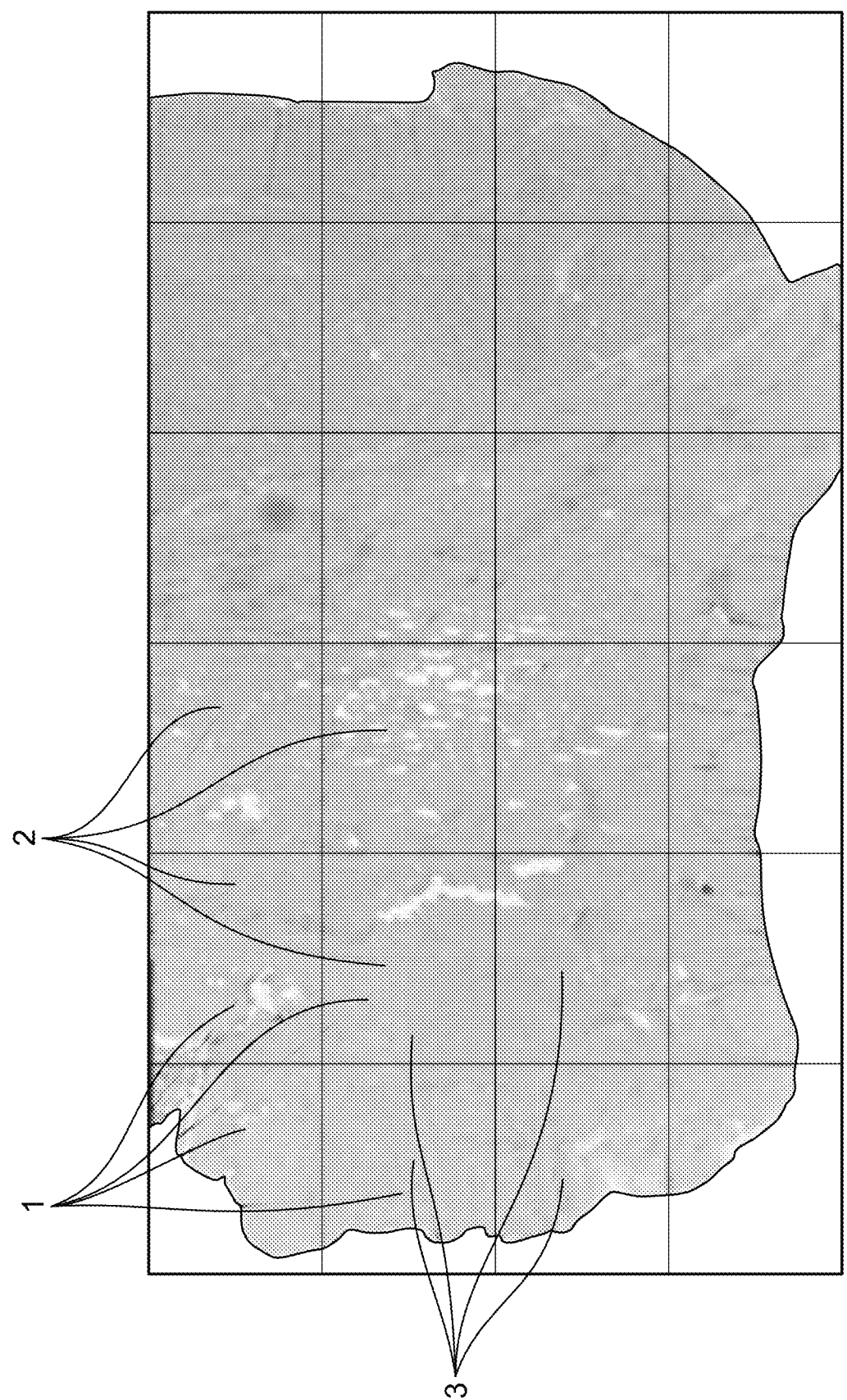
FIG. 3C is a window-demarcated diagram in the process for segmenting an image depicted in FIG. 3A.

FIG. 3B is a diagram of an example of the process for segmenting an image depicted in FIG. 3A. The three images on the left correspond to the 20× liver image, the 5× liver image, and the 1.25× liver image. The numbers here refer to the magnification factors based on the actual liver section.

Referring back to FIG. 3A, in 320, the device inputs the 20× liver image into the first neural network model (Network 1). In some embodiments, the device subjects, using the first neural network model, the 20× liver image to window demarcation testing and subjects, using the first neural network model, each small demarcated window (i.e., sub-image) to image segmentation processing to obtain a first initial segmentation result.

In some embodiments, to ensure the accuracy of segmentation results and avoid omissions, an overlap region exists between two of adjacent sub-images among the multiple sub-images of the first image.

In some embodiments, operation 310 further includes determining multiple sub-image segmentation regions in the first image and segmenting the multiple sub-image segmentation regions to obtain the multiple sub-images. In some embodiments, the sub-image segmentation regions include a first sub-image segmentation region and a second sub-image segmentation region, which are adjacent. In some embodiments, the first sub-image segmentation region and the second sub-image segmentation region overlap at least in part.

In some embodiments, the determining of the multiple sub-image segmentation regions in the first image and the segmenting of the multiple sub-image segmentation regions comprises: subjecting the first image to gridding processing to obtain a two-dimensionally gridded image; and in the two-dimensionally gridded image, segmenting the multiple sub-image segmentation regions by moving the target cutting window according to a target step length in a target dimension. In some embodiments, the number of cells of the target step length is no greater than the number of cells of the target cutting window in the target dimension. For example, the number of cells of the target step length is less than the number of cells of the target cutting window in the target dimension. For example, the number of cells of the target step length is equal to the number of cells of the target cutting window in the target dimension.

As an example, to avoid omissions when performing window demarcation testing, an overlap window demarcation approach is employed. In another example, an overlap region between adjacent small windows exists. In other words, two adjacent sub-images have an overlap region.

FIG. 3C is a window-demarcated diagram in the process for segmenting an image depicted in FIG. 3A. The diagram schematically presents three small windows, i.e., three target cutting windows after being moved according to a target step length in a target dimension. The three target cutting windows are indicated individually by the numbers 1, 2, and 3. As an example, both the length and the width of the target cutting window are two cells, and the overlap length and width are half the length and width of one window. In other words, the step length when a target cutting window moves is one grid cell. In some embodiments, one of ordinary skill adjusts the overlap dimensions as needed, i.e., adjusts the target step length. This adjustment also lies within the scope of the present application.

Figure 3D:
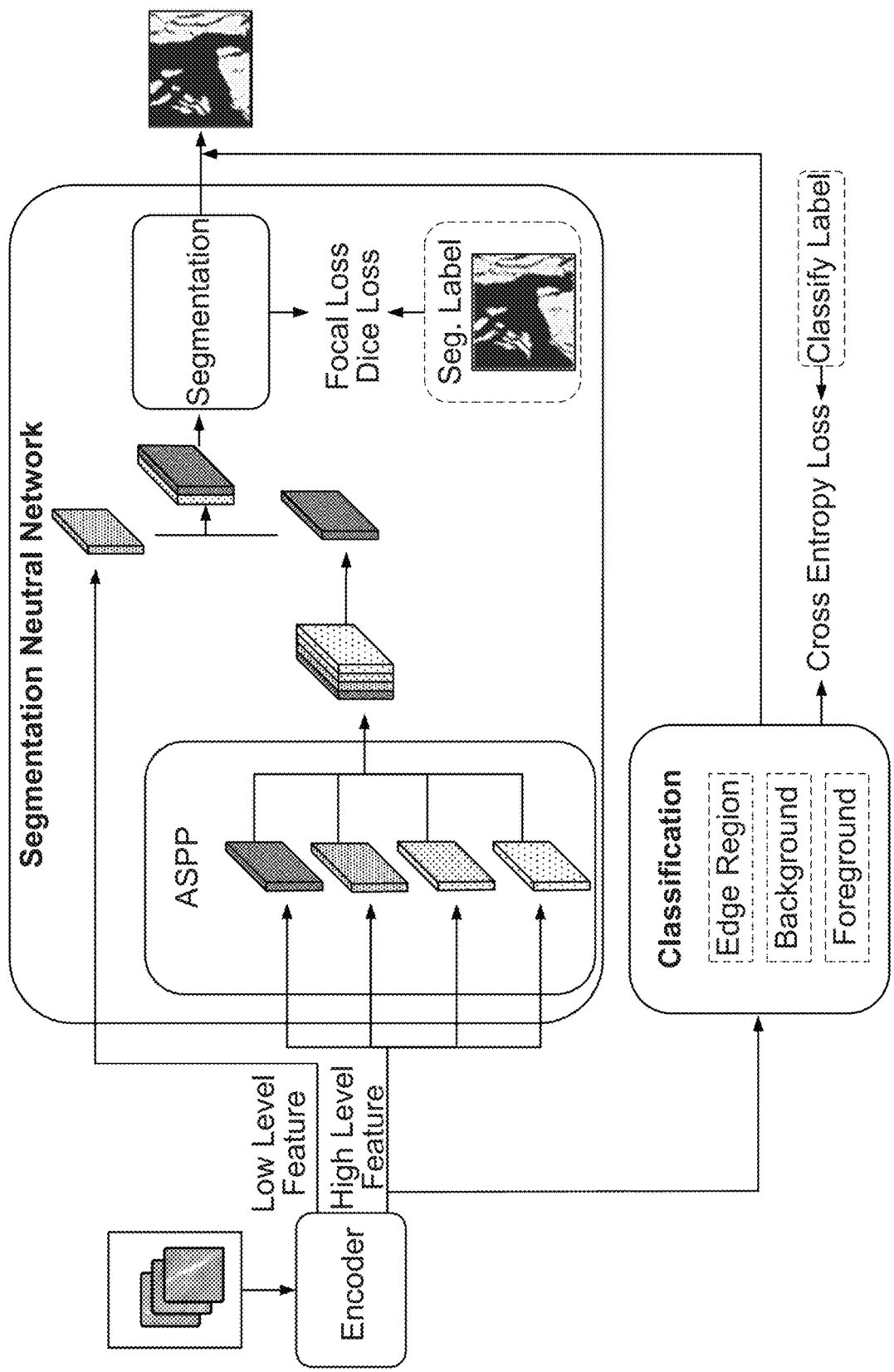
FIG. 3D is a structural diagram of a neural network model in the process for segmenting an image depicted in FIG. 3A.

FIG. 3D is a structural diagram of a neural network model in the process for segmenting an image depicted in FIG. 3A.

As shown in FIG. 3D, the first neural network model includes an encoder network (Encoder) configured to extract features from sub-images. As an example, the encoder network corresponds to a ResNet101 network.

As an example, the sub-image image features extracted by the encoder network (Encoder) include low-level features and high-level features. The low-level features typically include some detail information in the image, for example, edges, corners, colors, pixel values, gradients, or any combination thereof. The high-level features can be established upon the foundation of low-level features and can be richer in semantic information. The high-level features can be used in recognizing and detecting targets or object shapes in the image, i.e., performing initial segmentation on the image.

The encoder network (Encoder) can be connected to a segmentation neural network.

As an example, the segmentation neural network includes a pyramid pooling network (for example, Atrous Spatial Pyramid Pooling (ASPP)) and a decoder network (Segmentation).

Next, the high-level features are input into the ASPP, and the high-level features are processed by atrous convolutions of different sampling ratios to obtain image features of multiple scales. The image features of multiple scales then undergo pooling and are output.

Because the ASPP output occurs after image features of different scales are pooled, the dimensionality of the output image features is relatively high. Thus, the output image features can undergo dimensionality reduction and then be combined with the low-level features. Moreover, the combined image features can be input into the decoder network (Segmentation). The decoder network (Segmentation) can perform calculations based on the input image features and output the segmentation result. In some embodiments, the decoder network is a fully convolutional neural network model (Fully Convolutional Networks (FCN) for Semantic Segmentation), a convolutional neural network model for biomedical image segmentation (U-Net), a fully convolutional network model for pixel-level image segmentation (SegNet), or a deep learning model for image segmentation (DeepLab).

A 20× liver image has a high resolution. In the event that such an image is partitioned into small blocks, the tumor region is to account for larger proportions in the small blocks. As a result, the first neural network model has difficulty achieving convergence when trained. Therefore, in some embodiments, the first neural network model further includes a classification network (Classification) and determines the classification of sub-images based on the input high-level features.

In some embodiments, sub-image categories include "edge region," "background," "foreground," or any combination thereof.

In addition, since an example of a liver image is used, the "edge region" category can be a "tumor edge" category, the "background" category can be a "fully background" category, and the "foreground" category can be a "fully tumor" category. Moreover, the standard for which the corresponding categories are differentiated can be a tumor region as a proportion of the entire sub-image. For example, in the event that the ratio is 0.05 or lower, the sub-image is classified into the "fully background" category; in the event that the ratio is 0.95 or higher, the sub-image is classified into the "fully tumor" category; and in the event that the ratio is between 0.05 and 0.95, the sub-image is classified into the "tumor edge" category.

The process of training the first neural network model is as described below.

1) Predetermine a sample image and the true initial segmentation results of the sample image.
2) Determine multiple sample sub-images of the sample image, and input the multiple sample sub-images into the encoder network (Encoder).
3) The encoder network (Encoder) outputs high-level features of the current sample sub-image to the classification network. The classification network outputs the predicted classification result of the current sample sub-image.
4) Determine the true classification result (Classify mark) of the current sample sub-image based on the predicted classification result of the current sample sub-image and the true segmentation result of the sample sub-image. Perform backpropagation based on the cross-entropy loss function (Cross Entropy loss) and adjust the parameters of the encoder network (Encoder) and the classification network based on the predicted classification result and true classification result of the current sample sub-image.
5) The encoder network (Encoder) outputs high-level features and low-level features of the current sample sub-image to the segmentation neural network. The segmentation neural network outputs the predicted sub-segmentation result (Seg. pred.) of the current sample sub-image.
6) Determine whether the classification result of the current sample sub-image corresponds to the edge category.
7) In the event that the classification result of the current sample sub-image corresponds to the edge category, update the classification result of the current sample sub-image to the segmentation neural network via backpropagation. Thus, backpropagation can be performed based on a loss function (Focal loss, dice loss), the predicted sub-segmentation result (seg. pred.), and the true semantic sub-segmentation result (Seg. mark) of the current sample sub-image to adjust the parameters of the encoder network (Encoder) and the segmentation neural network.
8) In the event that the classification result of the current sample sub-image does not correspond to the edge category, do not perform backpropagation. In other words, do not adjust the parameters of the encoder network (Encoder) and the segmentation neural network based on the predicted sub-segmentation result of the current sample sub-image.

In some embodiments, while training the first neural network model, the parameters of the segmentation neural network are adjusted only in the event that the current sample sub-image type corresponds to the edge category. In other words, in the event that the sample sub-image corresponds to an edge sample sub-image. In this way, interference from non-edge regions can be avoided, and convergence speed can be increased.

In another example, during training, determining the categories of sample sub-images is possible. In some embodiments, if the current sample sub-image type is determined to correspond with the edge category, the low-level features and high-level features of the current sample sub-image are then input into the segmentation neural network. In yet another example, determining whether the current sample sub-image type is the edge category is possible after the segmentation neural network outputs the predicted sub-segmentation result for the current sample sub-image.

In some embodiments, the parameters of the encoder network (Encoder) are adjusted simultaneously based on the classification network and segmentation network output during training. Therefore, the architecture of the first neural network model can correspond to an end-to-end, multi-task segmentation network architecture.

The process of using the first neural network model is described below.

1) Perform window demarcation testing on a 20× liver image and thus obtain multiple sub-images of the 20× liver image.
2) Input multiple sub-images into the encoder network (Encoder).
3) The encoder network (Encoder) outputs high-level features of the current sub-image to the classification network. The classification network outputs the classification result of the current sample sub-image. Types of liver images include the "fully tumor" category, the "fully background" category, and the "tumor edge" category.
4) In the event that the classification result is "fully tumor," all of the pixels in the current sub-image are marked as "tumor." In other words, the sub-segmentation result is "fully tumor." In the event that the classification result is "fully background," all of the pixels in the current sub-image are marked as "background," and the sub-segmentation result is "fully background." In the event that the classification result is "tumor edge" (corresponding to an edge sub-image), the sub-segmentation result of the current sub-image (i.e., the sub-image includes a tumor in part and background in part) is determined by the segmentation neural network.

Referring back to FIG. 3B, after the sub-segmentation results (which correspond to the multiple sub-images) output by the first neural network undergo stitching, the result can be the first initial segmentation result corresponding to the 20× liver image.

In some embodiments, the aforementioned classification network is replaced by a logistic regression neural network for determining the ratio of the tumor to the sub-image that includes the tumor. Thus, the classification result of the sub-image can be determined based on the sub-image tumor ratio returned by the logistic regression neural network.

Referring back to FIG. 3A, in 330, the device inputs the 5× liver image into a second neural network model (Network 2). The device performs, using the second neural network model, image segmentation processing directly on the 5× liver image to obtain a second initial segmentation result.

In 340, the device inputs the 1.25× liver image into another second neural network model (Network 3). The device performs, using the other second neural network model (Network 3), image segmentation processing directly on the 1.25× liver image to obtain another second initial segmentation result.

In 350, the device subjects both of the second initial segmentation results to upsampling to cause both of the second initial segmentation results to have the same resolution as the first initial segmentation result.

In 360, the device merges the first initial segmentation result and both of the second initial segmentation results to obtain the target segmentation result.

In some embodiments, for each pixel position during the merging operation, the target segmentation marking information of the pixel position is determined based on the first segmentation marking information, the first piece of second segmentation marking information, and the second piece of the other second segmentation marking information, which are in the first initial segmentation result and in the second initial segmentation results and the other of the second initial segmentation results. Referring to FIG. 3B as an example, the first segmentation marking information comes from the ×20 image (operation 320 of FIG. 3A), the first piece of second segmentation marking information comes from the ×5 image (operation 330 of FIG. 3A), and the second piece of the other second segmentation marking information comes from the ×1.25 image (operation 340 of FIG. 3A).

For example, for the (300, 500) pixel position, the first segmentation marking information is indicated as "tumor," the first piece of second segmentation marking information is indicated as "background," and the second piece of the other second segmentation marking information is indicated as "background." In this case, the determination can be made that the target segmentation marking information of this pixel position is "background." It is understood that the above is merely an example for the purpose of explanation and is not intended to limit the present application.

The example of the three images (a 20× liver image, a 5× liver image, and a 1.25× liver image) is used for explanation purposes. In some embodiments, the greater the number of images with different resolutions, the more accurate the target segmentation result is to be determined.

Segmentation efficiencies of process 300 using 100 liver tumors are shown in the table below:

| Model | Dice | Jaccard |
| --- | --- | --- |
| U-Net | 0.910 | 0.785 |
| DeepLabv3+ | 0.935 | 0.880 |
| Multi-task network | 0.943 | 0.894 |
| Multi-task network (with MP) | 0.946 | 0.900 |

In the table, the "Model" column indicates the neural network model that is used. The multi-task network corresponds to the first neural network model in the above example. The "MP" in the table indicates a multi-view prediction strategy (during window demarcation, each sub-image undergoes multi-view data augmentation prediction). "Dice" corresponds to an evaluative index commonly used in medical image segmentation tasks. Jaccard differs from Dice and corresponds to another commonly used evaluative index for image segmentation.

As an example, a data augmentation prediction is a rotation augmentation prediction. For example, an image that is to be segmented (e.g., a sub-image of the first image) undergoes multi-angle rotation to obtain multiple images at different angles than that of the image to be segmented. As an example, the image to be segmented is a first image sub-image patch-A. Thus, following rotation, obtaining patch-B, patch-C, and patch-D, which have different directions, is possible. As a result, before and after rotation, four images are obtained. Subsequently, the image to be segmented and the images obtained from rotation can all undergo image segmentation processing, and the results from the image segmentation processing of each image can be merged to obtain a segmentation result corresponding to the image to be segmented. For example, the sub-segmentation result corresponding to a sub-image of the first image is obtained.

According to the table, the first neural network model (multi-task network) used to process a 20× liver image can output better results than conventional segmentation networks (U-Net, DeepLabv3+, etc.).

Tests have shown that an approach that further integrates three neural networks to separately process a 20× liver image, a 5× liver image, and a 1.25× liver image and then obtain a target segmentation result provides a 3.7% increase over a first neural network model that only processes a 20× liver image.

The process 300 for segmenting an image can be executed by any appropriate electronic device capable of processing data, including, for example, but not limited to: servers, mobile terminals (e.g., cell phones and PADs), and PCs.

Figure 4A:
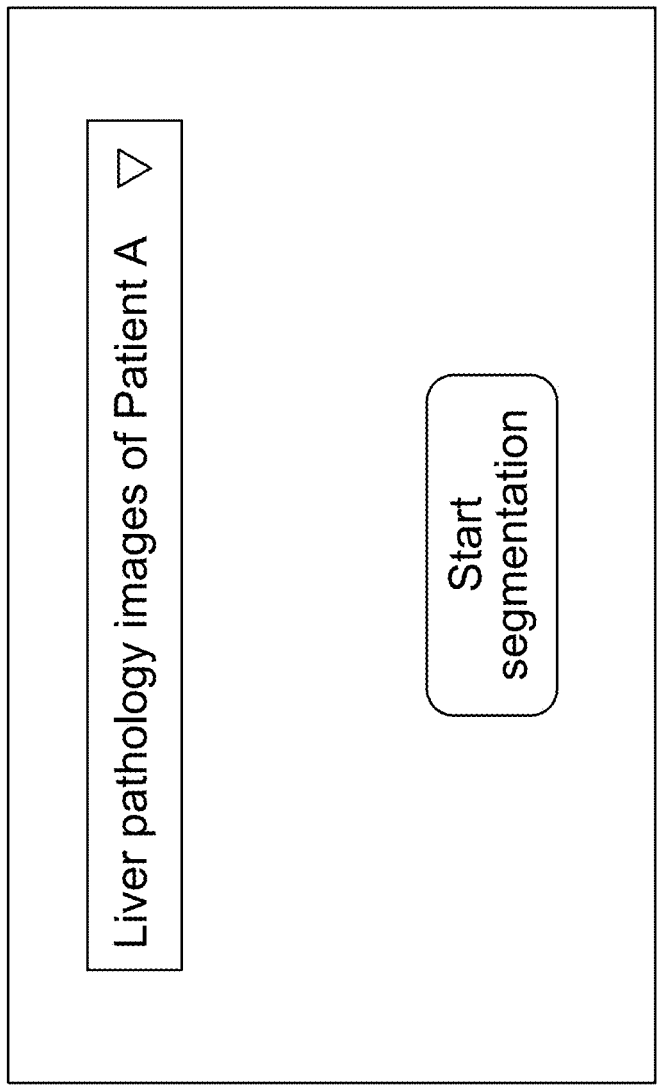
FIG. 4A is a diagram of an interface for the process for segmenting an image.

FIG. 4A is a diagram of an interface for the process for segmenting an image.

Prior to performing image segmentation, one can select an image to be segmented through the interface. For example, one can select "Liver pathology images of Patient A" and then trigger the "Start segmentation" button. At this point, two or more differing-resolution liver pathology images corresponding to Patient A can be processed using the above process 300 of FIG. 3A to obtain a target segmentation result corresponding to the liver pathology image.

In some embodiments, the image is selected or uploaded in another way.

Figure 4B:
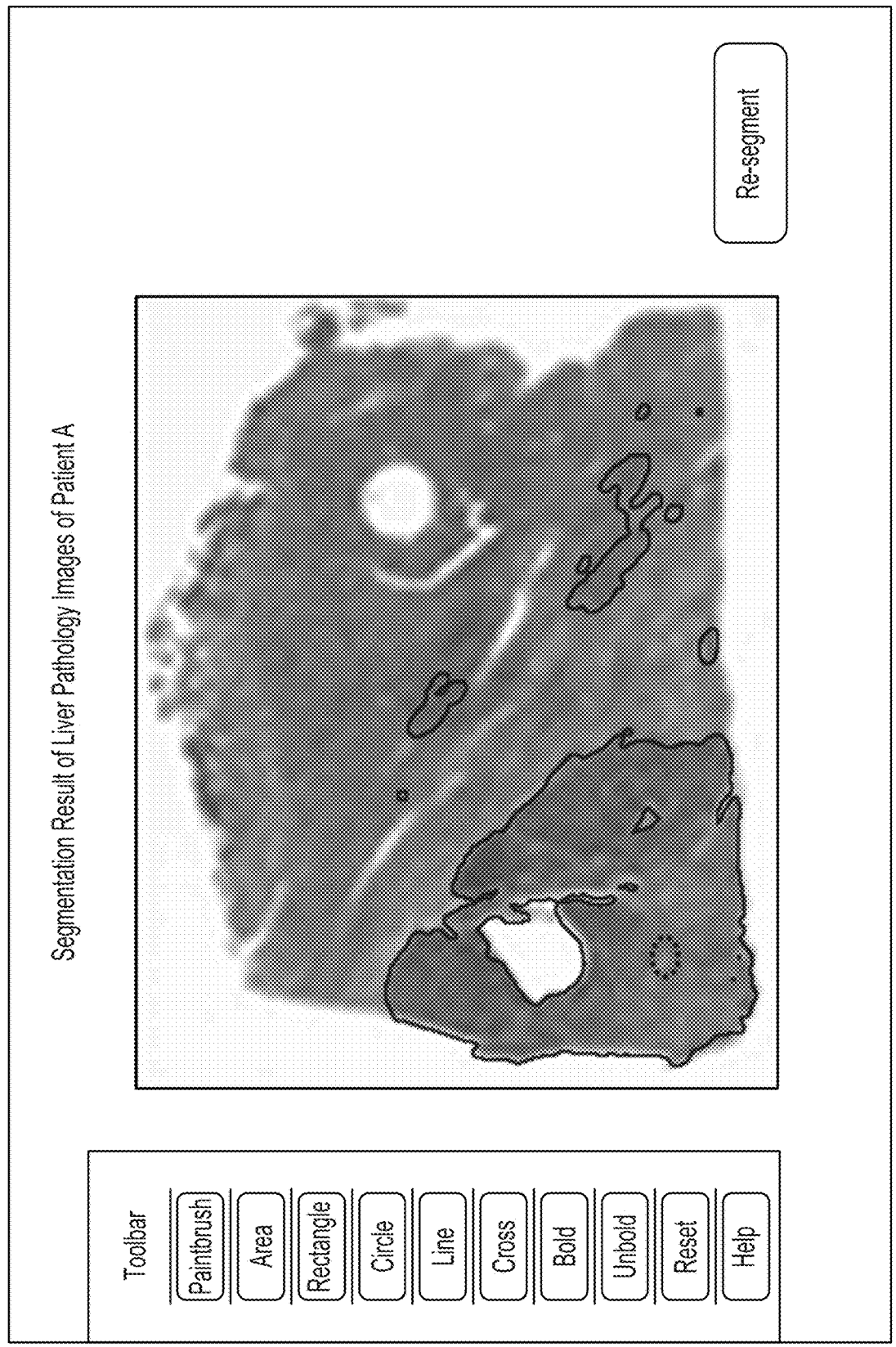
FIG. 4B is a diagram of another interface for the process for segmenting an image.

FIG. 4B is a diagram of another interface for the process for segmenting an image. After obtaining the target segmentation result corresponding to the liver pathology image, the target segmentation result can be presented through the interface.

The edges of a lesion in the liver pathology image can be determined based on the target segmentation result. Thus, the lesion edges can be presented superimposed on the original liver pathology image, e.g., as shown by the solid lines.

In the event that the user is dissatisfied with the recognition result, the user can roughly sketch the desired lesion edges on the interface or determine the lesion region that the user wishes to be recognized. For example, a dotted-line oval could be a lesion region that the user sketched and wishes to be recognized. After sketching the dotted-line oval, the user can trigger the "Re-segment" button on the interface. Thus, again performing image segmentation processing is possible using the process 300 while using the user's sketch.

Figure 5A:
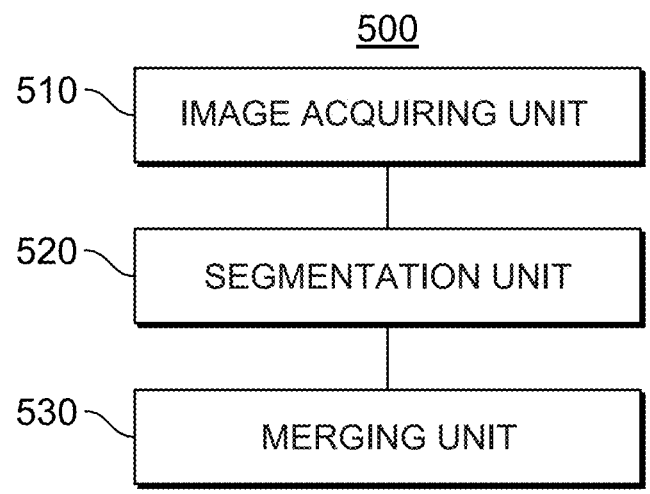
FIG. 5A is a structural block diagram of an embodiment of a system for segmenting an image.

FIG. 5A is a structural block diagram of an embodiment of a system for segmenting an image. In some embodiments, the system 500 is configured to perform the process 100 of FIG. 1 and comprises: an image acquiring unit 510, a segmentation unit 520, and a merging unit 530.

In some embodiments, the image acquiring unit 510 is configured to acquire a first image and a second image. In some embodiments, the first image and the second image are acquired based on the same imaging target, and the resolution of the first image is greater than the resolution of the second image.

In some embodiments, the segmentation unit 520 is configured to perform image segmentation processing using multiple sub-images of the first image to obtain a first initial segmentation result and perform image segmentation processing based on the second image to obtain a second initial segmentation result.

The merging unit 530 is configured to merge the first initial segmentation result with the second initial segmentation result based on the imaging target to obtain a target segmentation result.

Figure 5B:
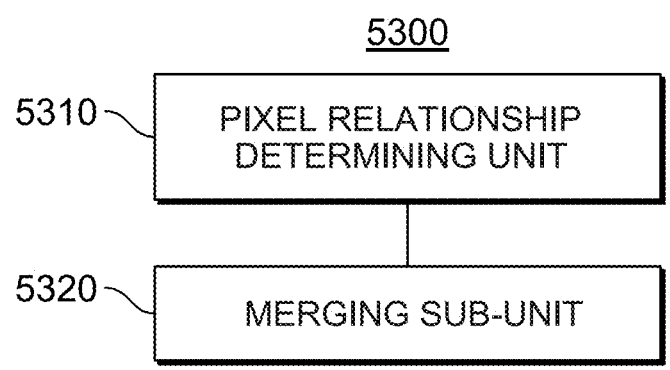
FIG. 5B is a structural block diagram of an embodiment of a merging unit.

FIG. 5B is a structural block diagram of an embodiment of a merging unit. In some embodiments, the merging unit 5300 is an implementation of the merging unit 530 of FIG. 5A and comprises: a pixel relationship determining unit 5310, and a merging sub-unit 5320.

In some embodiments, the pixel relationship determining unit 5310 is configured to determine pixel correspondences of the first initial segmentation result and the second initial segmentation result based on the imaging target result.

In some embodiments, the merging sub-unit 5320 is configured to merge the first initial segmentation result with the second initial segmentation result based on the pixel correspondences to obtain the target segmentation result.

Figure 5C:
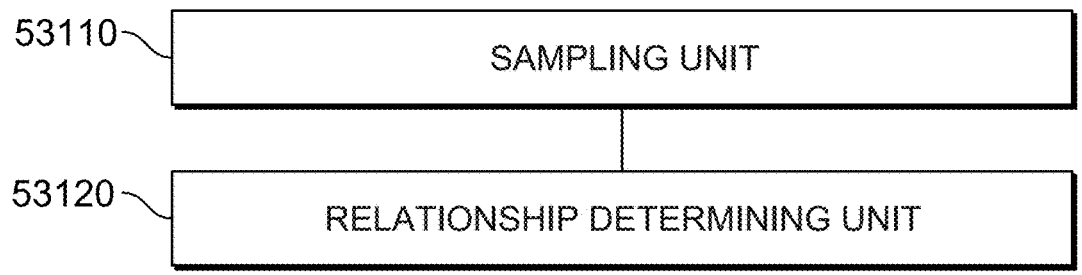
FIG. 5C is a structural block diagram of an embodiment of a pixel relationship determining unit.

FIG. 5C is a structural block diagram of an embodiment of a pixel relationship determining unit. In some embodiments, the pixel relationship determining unit 53100 is an implementation of the pixel relationship determining unit 5310 of FIG. 5B and comprises: a sampling unit 53110, and a relationship determining unit 53120.

In some embodiments, the sampling unit 53110 is configured to downsample the first initial segmentation result and/or upsample the second initial segmentation result to cause the resolution of the first initial segmentation result and the resolution of the second initial segmentation result to become the same.

In some embodiments, the relationship determining unit 53120 is configured to determine the pixel correspondences based on the first initial segmentation result and the second initial segmentation result.

Figure 5D:
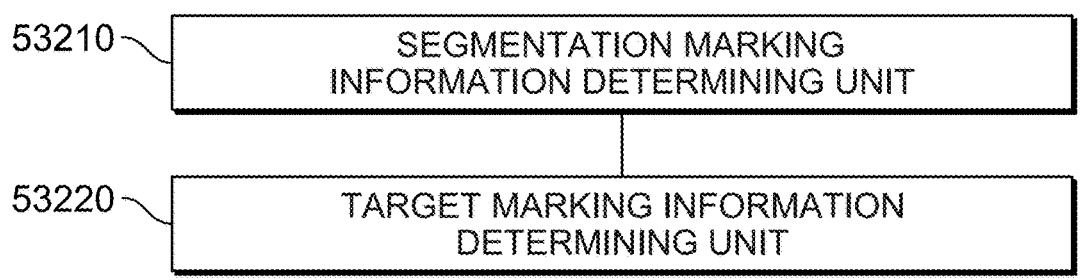
FIG. 5D is a structural block diagram of an embodiment of a merging sub-unit.

FIG. 5D is a structural block diagram of an embodiment of a merging sub-unit. In some embodiments, the merging sub-unit 53200 is an implementation of the merging sub-unit 5320 of FIG. 5C and comprises: a segmentation marking information determining unit 53210 and a target marking information determining unit 53220.

In some embodiments, the segmentation marking information determining unit 53210 is configured to separately determine first segmentation marking information and second segmentation marking information of target pixel positions in the first initial segmentation result and the second initial segmentation result based on the pixel correspondences.

In some embodiments, the target marking information determining unit 53220 is configured to determine target segmentation marking information of the target pixel positions based on the first segmentation marking information and the second segmentation marking information to obtain the target segmentation result.

Referring back to FIG. 5A, in some embodiments, the segmentation unit 520 of FIG. 5A is further configured to identify multiple non-edge sub-images that do not include an edge of the imaging target from among the multiple sub-images, and determine multiple sub-segmentation results corresponding to the multiple non-edge sub-images based on the image content included in the multiple non-edge sub-images.

In some embodiments, the segmentation unit 520 is further configured to specifically stitch together the multiple sub-segmentation results of the multiple edge sub-images with the multiple sub-segmentation results of the multiple non-edge sub-images to obtain the first initial segmentation result.

In some embodiments, the segmentation unit 520 is further configured to classify the multiple sub-images using a pre-trained classifier to identify, from the multiple sub-images, multiple edge sub-images that include an edge of the imaging target.

In some embodiments, the identifying, from the multiple sub-images, of the multiple edge sub-images that include an edge of the imaging target comprises: cutting a sample image into multiple sample sub-images, identifying, from the multiple sample sub-images, multiple edge sample sub-images that include an edge of the imaging target, determining, using the segmentation neural network, edge prediction sub-segmentation results corresponding to the multiple edge sample sub-images, and adjusting parameters in the segmentation neural network based on the edge prediction sub-segmentation results.

In some embodiments, the image acquiring unit 510 is further configured to scan the imaging target separately according to a first scanning magnification and a second scanning magnification to obtain the first image and the second image. In some embodiments, the first scanning magnification is greater than the second scanning magnification, and the result is that the resolution of the first image is greater than the resolution of the second image.

In some embodiments, an overlap region between two of sub-images having adjacent positions among the multiple sub-images of the first image exists.

In some embodiments, the image acquiring unit 510 is further configured to determine multiple sub-image segmentation regions in the first image and segment the multiple sub-image segmentation regions to obtain the multiple sub-images. In some embodiments, the sub-image segmentation regions include a first sub-image segmentation region and a second sub-image segmentation region, which are adjacent, and the first sub-image segmentation region and second sub-image segmentation region overlap at least in part.

In some embodiments, the image acquiring unit 510 is further configured to subject the first image to gridding processing to obtain a two-dimensionally gridded image, and in the two-dimensionally gridded image, segment the multiple sub-image segmentation regions by moving the target cutting window based on a target step length in a target dimension. In some embodiments, the number of cells of the target step length is no greater than the number of cells of the target cutting window in the target dimension. For example, the number of cells of the target step length is less than the number of cells of the target cutting window in the target dimension. In another example, the number of cells of the target step length is equal to the number of cells of the target cutting window in the target dimension.

An example of a process for segmenting an image is as follows: a first image and a second image are acquired. The first image and the second image are obtained based on the same imaging target, and the resolution of the first image is greater than the resolution of the second image. A first initial segmentation result is obtained by performing image segmentation processing based on multiple sub-images of the first image to cause the first initial segmentation result to be more focused on local features. In other words, the first initial segmentation result is more precise, but errors can occur in a segmentation result corresponding to a particular sub-image. A second initial segmentation result is obtained by performing image segmentation processing based on the second image to cause the second initial segmentation result to be more focused on global features. In other words, the position of the segmented imaging target is more accurate, and no local errors occur. As an aspect, the segmentation results for edge regions of the imaging target are insufficiently precise. Thus, merging the first initial segmentation result with the second initial segmentation result based on the imaging target to obtain a target segmentation result is possible. The precision of the target segmentation result can be ensured by the first initial segmentation result, and errors in the segmentation result corresponding to a specific sub-image in the first initial segmentation result can be corrected by the second initial segmentation result, thus increasing the accuracy and precision of the target segmentation result.

A system for segmenting an image is configured to implement the corresponding processes for segmenting an image described above. Moreover, the system includes at least some of the benefits of the corresponding embodiments of the above processes, which will not be discussed further here for conciseness.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Figure 6:
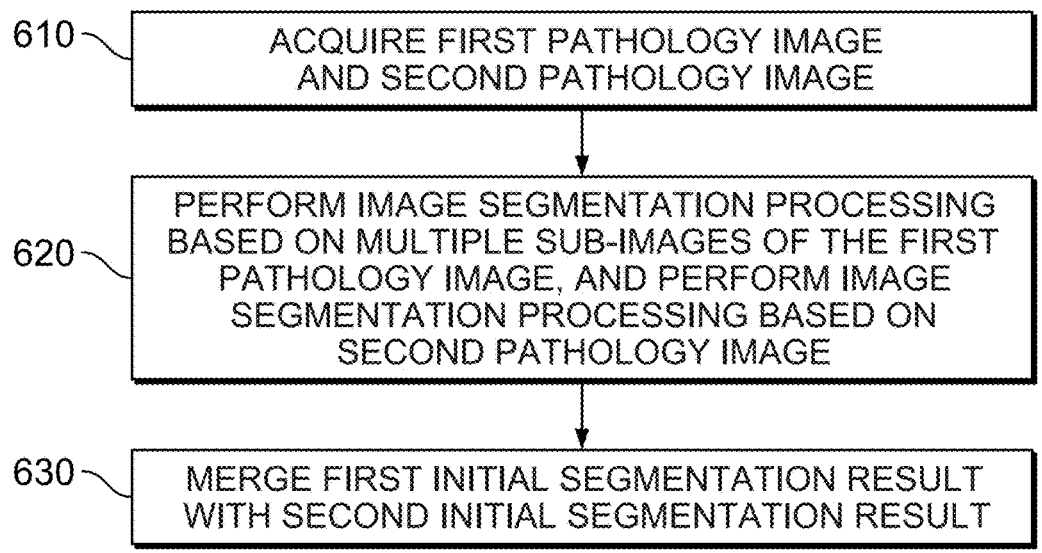
FIG. 6 is a flowchart of yet another embodiment of a process for segmenting an image.

FIG. 6 is a flowchart of yet another embodiment of a process for segmenting an image. In some embodiments, the process 600 is implemented by the device 700 of FIG. 7 and comprises:

In 610, the device acquires a first pathology image and a second pathology image.

In some embodiments, the first pathology image and the second pathology image are obtained using the same lesion region, and the resolution of the first pathology image is greater than the resolution of the second pathology image.

As an example, the lesion region includes a tumor region on a liver.

In 620, the device performs image segmentation processing based on multiple sub-images of the first pathology image to obtain a first initial segmentation result, and performs image segmentation processing based on the second pathology image to obtain a second initial segmentation result.

In some embodiments, an overlap region between two adjacent sub-images among the multiple sub-images of the first pathology image exists.

In some embodiments, the device determines multiple sub-image segmentation regions in the first pathology image and segments the multiple sub-image segmentation regions to obtain the multiple sub-images. In some embodiments, the sub-image segmentation regions include a first sub-image segmentation region and a second sub-image segmentation region, which are adjacent, and the first sub-image segmentation region and the second sub-image segmentation region overlap at least in part.

In some embodiments, the determining of the multiple sub-image segmentation regions in the first pathology image and the segmenting of the multiple sub-image segmentation regions comprises: subjecting the first image to gridding processing to obtain a two-dimensionally gridded image; and in the two-dimensionally gridded image, segmenting the multiple sub-image segmentation regions by moving the target cutting window according to a target step length in a target dimension. In some embodiments, the number of cells of the target step length is no greater than the number of cells of the target cutting window in the target dimension. For example, the number of cells of the target step length is less than the number of cells of the target cutting window in the target dimension. In another example, the number of cells of the target step length is equal to the number of cells of the target cutting window in the target dimension.

In 630, the device merges the first initial segmentation result with the second initial segmentation result using the lesion region to obtain a target segmentation result.

In some embodiments, in operation 630, the merging of the first initial segmentation result with the second initial segmentation result using the lesion region comprises: determining pixel correspondences of the first initial segmentation result and the second initial segmentation result based on the lesion region; and merging the first initial segmentation result with the second initial segmentation result based on the pixel correspondences to obtain the target segmentation result.

In some embodiments, the determining of the pixel correspondences of the first initial segmentation result and the second initial segmentation result based on the lesion region comprises: downsampling the first initial segmentation result and/or upsampling the second initial segmentation result to cause the resolution of the first initial segmentation result and the resolution of the second initial segmentation result to become the same; and determining the pixel correspondences based on the first initial segmentation result and the second initial segmentation result whose resolutions are the same.

In some embodiments, the merging of the first initial segmentation result with the second initial segmentation result based on the pixel correspondences to obtain the target segmentation result comprises: separately determining first segmentation marking information and second segmentation marking information of target pixel positions in the first initial segmentation result and the second initial segmentation result based on the pixel correspondences; and determining target segmentation marking information of the target pixel positions based on the first segmentation marking information and the second segmentation marking information to obtain the target segmentation result.

In some embodiments, the performing of the image segmentation processing based on multiple sub-images of a first image to obtain a first initial segmentation result comprises: identifying multiple edge sub-images that include a lesion edge of the lesion region from among the multiple sub-images; performing image segmentation processing on the multiple edge sub-images using a pre-trained segmentation neural network to obtain multiple sub-segmentation results individually corresponding to the edge sub-images; and obtaining the first initial segmentation result based on the multiple sub-segmentation results.

In some embodiments, the performing of the image segmentation processing based on multiple sub-images of the first pathology image to obtain a first initial segmentation result, and the performing of the image segmentation processing based on the second pathology image to obtain a second initial segmentation result further comprises: identifying multiple non-edge sub-images that do not include a lesion edge of the lesion region from among the multiple sub-images and determining multiple sub-segmentation results corresponding to the multiple non-edge sub-images based on the image content included in the multiple non-edge sub-images.

In some embodiments, the obtaining of the first initial segmentation result based on the multiple sub-segmentation results further comprises: stitching together the multiple sub-segmentation results of the multiple edge sub-images with the multiple sub-segmentation results of the multiple non-edge sub-images to obtain the first initial segmentation result.

In some embodiments, a lesion edge corresponds with the edge of a tumor on a liver.

In some embodiments, the identifying of the multiple edge sub-images that include a lesion edge of the lesion region from among the multiple sub-images comprises: classifying the multiple sub-images using a pre-trained classifier to identify, from the multiple sub-images, multiple edge sub-images that include an edge of the lesion region.

In some embodiments, the segmentation neural network is pre-trained using the technique below: cutting a sample image into multiple sample sub-images and identifying, from the multiple sample sub-images, the multiple edge sample sub-images that include an edge of the lesion region; determining, using the segmentation neural network, edge prediction sub-segmentation results corresponding to the multiple edge sample sub-images; and adjusting parameters in the segmentation neural network based on the edge prediction sub-segmentation results.

In some embodiments, the acquiring of the first pathology image and the second pathology image comprises: scanning a diseased organ section including a lesion region separately using a first scanning magnification and a second scanning magnification to obtain the first pathology image and the second pathology image. In some embodiments, the first scanning magnification is greater than the second scanning magnification, and as a result, the resolution of the first pathology image is greater than the resolution of the second pathology image.

A process for segmenting an image is as follows: a first pathology image and a second pathology image are acquired. The first pathology image and the second pathology image are obtained based on the same lesion region, and the resolution of the first pathology image is greater than the resolution of the second pathology image. A first initial segmentation result is obtained by performing image segmentation processing based on multiple sub-images of the first pathology image to cause the first initial segmentation result to be more focused on local features. In other words, the first initial segmentation result is more precise, but errors can occur in the segmentation result corresponding to a specific sub-image. A second initial segmentation result is obtained by performing image segmentation processing based on the second pathology image to cause the second initial segmentation result to be more focused on global features. In other words, the position of the segmented imaging target is more accurate, and no local errors occur. However, the segmentation results for edge regions of the imaging target can be insufficiently precise. Thus, merging the first initial segmentation result with the second initial segmentation result based on the lesion region to obtain a target segmentation result is possible. The precision of the target segmentation result can be ensured by the first initial segmentation result, and errors in the segmentation result corresponding to a specific sub-image in the first initial segmentation result can be corrected by the second initial segmentation result, thus increasing the accuracy and precision of the target segmentation result. Ensuring higher accuracy of lesion region boundaries determined according to the target segmentation result is possible.

The process 600 for segmenting an image can be performed by any appropriate electronic device capable of processing data, including but not limited to: servers, mobile terminals (e.g., cell phones and PADs), and PCs.

Figure 7:
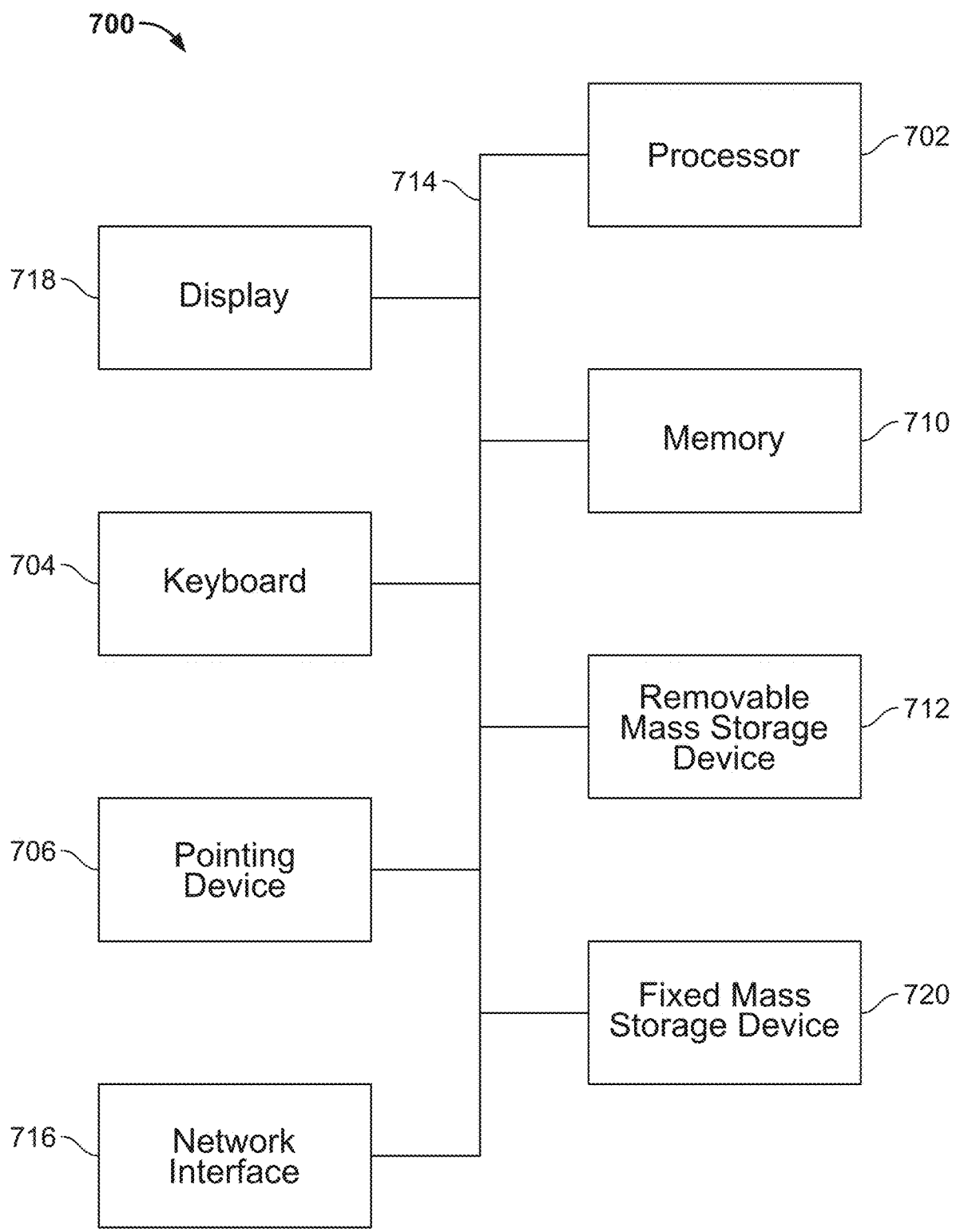
FIG. 7 is a functional diagram illustrating a programmed computer system for segmenting an image in accordance with some embodiments.

FIG. 7 is a functional diagram illustrating a programmed computer system for segmenting an image in accordance with some embodiments. As will be apparent, other computer system architectures and configurations can be used to segment an image. Computer system or device 100, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system or device 700. Using instructions retrieved from memory 710, the processor 702 controls the reception and manipulation of input data, and the output and display of data on output devices (e.g., display 718). In some embodiments, processor 702 is used to segment an image.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712 and 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

In some embodiments, a method for performing image segmentation is provided. The method comprises acquiring a first pathology image and a second pathology image, wherein the first pathology image and the second pathology image are acquired based on a same lesion region, and wherein a resolution of the first pathology image is greater than a resolution of the second pathology image; performing image segmentation processing based on a plurality of sub-images of the first pathology image to obtain a first initial segmentation result, and performing image segmentation processing based on the second pathology image to obtain a second initial segmentation result; merging the first initial segmentation result with the second initial segmentation result based on the lesion region to obtain a target segmentation result; and outputting or storing the target segmentation result.

In some embodiments, a system for performing image segmentation is provided. The system comprises a processor; and a memory coupled with the processor, wherein the memory is configured to provide the processor with instructions which when executed cause the processor to: acquire a first pathology image and a second pathology image, wherein the first pathology image and the second pathology image are acquired based on a same lesion region, and wherein a resolution of the first pathology image is greater than a resolution of the second pathology image; perform image segmentation processing based on a plurality of sub-images of the first pathology image to obtain a first initial segmentation result, and perform image segmentation processing based on the second pathology image to obtain a second initial segmentation result; merge the first initial segmentation result with the second initial segmentation result based on the lesion region to obtain a target segmentation result; and output or store the target segment result.

In some embodiments, a computer program product for performing image segmentation is provided. The computer program product comprises computer instructions for: acquiring a first pathology image and a second pathology image, wherein the first pathology image and the second pathology image are acquired based on a same lesion region, and wherein a resolution of the first pathology image is greater than a resolution of the second pathology image; performing image segmentation processing based on a plurality of sub-images of the first pathology image to obtain a first initial segmentation result, and performing image segmentation processing based on the second pathology image to obtain a second initial segmentation result; merging the first initial segmentation result with the second initial segmentation result based on the lesion region to obtain a target segmentation result; and outputting or storing the target segmentation result.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
   acquiring a first image and a second image, wherein the first image and the second image are acquired based on a same imaging target, and wherein a resolution of the first image is greater than a resolution of the second image;
   performing image segmentation processing based on a plurality of sub-images of the first image to obtain a first initial segmentation result, comprising:
      identifying a plurality of edge sub-images that include an edge of the imaging target from among the plurality of sub-images;
      performing image segmentation processing on the plurality of edge sub-images using a pre-trained segmentation neural network to obtain a plurality of sub-segmentation results individually corresponding to the plurality of edge sub-images;
      identifying a plurality of non-edge sub-images that do not include an edge of the imaging target from among the plurality of sub-images;
      determining a plurality of sub-segmentation results corresponding to the plurality of non-edge sub-images based on image content included in the plurality of non-edge sub-images; and
      obtaining the first initial segmentation result based on the plurality of sub-segmentation results, comprising:
         stitching together the plurality of sub-segmentation results of the plurality of edge sub-images with the plurality of sub-segmentation results of the plurality of non-edge sub-images to obtain the first initial segmentation result;
   performing image segmentation processing based on the second image to obtain a second initial segmentation result;
   merging, based on the imaging target, the first initial segmentation result with the second initial segmentation result to obtain a target segmentation result; and
   outputting or storing the target segment result.

2. The method as described in claim 1, wherein the merging of the first initial segmentation result with the second initial segmentation result comprises:
   determining pixel correspondences of the first initial segmentation result and the second initial segmentation result based on the imaging target; and
   merging the first initial segmentation result with the second initial segmentation result based on the pixel correspondences to obtain the target segmentation result.

3. The method as described in claim 2, wherein the determining of the pixel correspondences of the first initial segmentation result and the second initial segmentation result comprises:
   downsampling the first initial segmentation result, upsampling the second initial segmentation result, or both, causing the resolution of the first initial segmentation result and the resolution of the second initial segmentation result to become the same; and
   determining the pixel correspondences based on the first initial segmentation result and the second initial segmentation result having the same resolutions.

4. The method as described in claim 2, wherein the merging of the first initial segmentation result with the second initial segmentation result comprises:
   separately determining first segmentation marking information and second segmentation marking information of target pixel positions in the first initial segmentation result and the second initial segmentation result based on the pixel correspondences; and
   determining target segmentation marking information of the target pixel positions based on the first segmentation marking information and the second segmentation marking information to obtain the target segmentation result.

5. The method as described in claim 1, wherein the identifying of the plurality of non-edge sub-images that do not include an edge of the imaging target from among the plurality of sub-images comprises:
   classifying the plurality of sub-images using a pre-trained classifier to identify, from the plurality of sub-images, a plurality of edge sub-images that include the edge of the imaging target.

6. The method as described in claim 1, wherein the segmentation neural network is pre-trained based on the following:
   cutting a sample image into a plurality of sample sub-images;
   identifying, using the plurality of sample sub-images, from a plurality of edge sample sub-images that include the edge of the imaging target;
   determining, using the segmentation neural network, edge prediction sub-segmentation results corresponding to the plurality of edge sample sub-images; and
   adjusting parameters in the segmentation neural network based on the edge prediction sub-segmentation results.

7. The method as described in claim 1, wherein the acquiring of the first image and the second image comprises:
   scanning the imaging target separately using a first scanning magnification and a second scanning magnification to obtain the first image and the second image, wherein the first scanning magnification is greater than the second scanning magnification.

8. The method as described in claim 1, wherein an overlap region exists between two adjacent sub-images among the plurality of sub-images of the first image.

9. The method as described in claim 1, wherein the performing of the image segmentation processing based on the plurality of sub-images of the first image to obtain the first initial segmentation result comprises:
   determining a plurality of sub-image segmentation regions in the first image, wherein the plurality of sub-image segmentation regions comprise a first sub-image segmentation region and a second sub-image segmentation region, wherein the first sub-image segmentation region and the second sub-image segmentation region are adjacent to each other, and wherein the first sub-image segmentation region and the second sub-image segmentation region overlap each other at least in part; and
   segmenting the plurality of sub-image segmentation regions to obtain the plurality of sub-images.

10. The method as described in claim 9, wherein the determining of the plurality of sub-image segmentation regions in the first image and the segmenting of the plurality of sub-image segmentation regions comprises:
    subjecting the first image to gridding processing to obtain a two-dimensionally gridded image; and segmenting, in the two-dimensionally gridded image, the plurality of sub-image segmentation regions by moving a target cutting window using a target step length in a target dimension, wherein a number of cells of the target step length is less than a number of cells of the target cutting window in the target dimension.

11. A system, comprising:
a processor; and
a memory coupled with the processor, wherein the memory is configured to provide the processor with instructions which when executed cause the processor to:
    acquire a first image and a second image, wherein the first image and the second image are acquired based on a same imaging target, and wherein a resolution of the first image is greater than a resolution of the second image;
    perform image segmentation processing based on a plurality of sub-images of the first image to obtain a first initial segmentation result, comprising to:
        identify a plurality of edge sub-images that include an edge of the imaging target from among the plurality of sub-images;
        perform image segmentation processing on the plurality of edge sub-images using a pre-trained segmentation neural network to obtain a plurality of sub-segmentation results individually corresponding to the plurality of edge sub-images;
        identify a plurality of non-edge sub-images that do not include an edge of the imaging target from among the plurality of sub-images;
        determine a plurality of sub-segmentation results corresponding to the plurality of non-edge sub-images based on image content included in the plurality of non-edge sub-images; and
        obtain the first initial segmentation result based on the plurality of sub-segmentation results, comprising to:
            stitch together the plurality of sub-segmentation results of the plurality of edge sub-images with the plurality of sub-segmentation results of the plurality of non-edge sub-images to obtain the first initial segmentation result;
    perform image segmentation processing based on the second image to obtain a second initial segmentation result; and
    merge, based on the imaging target, the first initial segmentation result with the second initial segmentation result to obtain a target segmentation result; and
    output or store the target segment result.

12. A computer program product being embodied in a tangible non-transitory computer readable storage medium and comprising computer instructions for:
    acquiring a first image and a second image, wherein the first image and the second image are acquired based on a same imaging target, and wherein a resolution of the first image is greater than a resolution of the second image;
    performing image segmentation processing based on a plurality of sub-images of the first image to obtain a first initial segmentation result, comprising:
        identifying a plurality of edge sub-images that include an edge of the imaging target from among the plurality of sub-images;
        performing image segmentation processing on the plurality of edge sub-images using a pre-trained segmentation neural network to obtain a plurality of sub-segmentation results individually corresponding to the plurality of edge sub-images;
        identifying a plurality of non-edge sub-images that do not include an edge of the imaging target from among the plurality of sub-images;
        determining a plurality of sub-segmentation results corresponding to the plurality of non-edge sub-images based on image content included in the plurality of non-edge sub-images; and
        obtaining the first initial segmentation result based on the plurality of sub-segmentation results, comprising:
            stitching together the plurality of sub-segmentation results of the plurality of edge sub-images with the plurality of sub-segmentation results of the plurality of non-edge sub-images to obtain the first initial segmentation result;
    performing image segmentation processing based on the second image to obtain a second initial segmentation result;
    merging, based on the imaging target, the first initial segmentation result with the second initial segmentation result to obtain a target segmentation result; and
    outputting or storing the target segmentation result.

\* \* \* \* \*